United States Patent
Suzuki

(10) Patent No.: US 6,333,903 B1
(45) Date of Patent: Dec. 25, 2001

(54) DISK UNIT AND ROTATING MOTOR CONTROL APPARATUS FOR RECORDABLE OPTICAL DISK UNIT

(75) Inventor: Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/568,542

(22) Filed: May 11, 2000

Related U.S. Application Data

(62) Division of application No. 09/059,589, filed on Apr. 14, 1998, now Pat. No. 6,128,261.

(30) Foreign Application Priority Data

| Apr. 15, 1997 | (JP) | .................................................... 9-113503 |
| Jun. 16, 1997 | (JP) | .................................................... 9-172774 |

(51) Int. Cl.[7] .................................................... G11B 5/09
(52) U.S. Cl. ................... 369/50; 369/47; 369/40
(58) Field of Search ............... 369/47, 50, 54, 369/58, 124.14, 275.4, 44.13, 47.38, 47.39, 47.4, 47.47, 47.48, 53.3, 53.43; 360/73.03

(56) References Cited

U.S. PATENT DOCUMENTS

| 4,390,977 | 6/1983 | Onigata et al. . |
| 5,508,985 | 4/1996 | Fairchild et al. . |
| 5,754,522 | * 5/1998 | Kobayashi et al. ........... 369/275.4 X |
| 5,933,399 | * 8/1999 | Kim ...................................... 369/50 |
| 5,946,279 | * 8/1999 | Okada et al. ...................... 369/47 X |

FOREIGN PATENT DOCUMENTS

| 0 138 211 | 4/1985 | (EP) . |
| 0 344 994 | 12/1989 | (EP) . |
| 5-225580 | 9/1993 | (JP) . |
| 6-338066 | 12/1994 | (JP) . |
| 97/09717 | 3/1997 | (WO) . |

* cited by examiner

Primary Examiner—Paul W. Huber
(74) Attorney, Agent, or Firm—Dickstein Shapiro Morin & Oshinsky LLP

(57) ABSTRACT

A rotating motor control apparatus for a recordable optical disk unit is constructed to include a data synchronizing rotation control circuit controlling rotation of a rotating motor in synchronism with a recorded data signal, a zigzag synchronizing rotation control circuit controlling the rotation of the rotating motor in synchronism with a zigzag of a guide groove of a disk, a phase synchronizing circuit synchronizing to a phase of the data signal, and a synchronous detection circuit detecting a synchronized state of the phase synchronizing circuit and outputting a lock signal, where the data synchronizing rotation control circuit drives the rotating motor when the lock signal is obtained, and the zigzag synchronizing rotation control circuit drives the rotating motor when no lock signal is obtained.

4 Claims, 23 Drawing Sheets

FIG. 5

| PIN NAME | TYPE | DESCRIPTION |
|---|---|---|
| | | MOTOR INTERFACE PIN DESCRIPTION |
| REVDET | IN | REVERSE DETECT: MOTOR DRIVER REVERSE ROTATION DETECTION SIGNAL |
| DPLOCK | IN | DSP PLL LOCK: CD DSP PLL LOCK SIGNAL |
| FGIN | IN | FG IN: FG, HG PULSE INPUT |
| TON | I/O | TRACKING SERVO ON: TRACKING SERVO ON SIGNAL |
| MPWM | OUT | MOTOR PWM: PWM PULSE OUTPUT (LOW, HIGH, Z) |
| MPWMN | OUT | MOTOR PWM NEGATIVE: PWM PULSE OUTPUT |
| MPWMP | OUT | MOTOR PWM POSITIVE: PWM PULSE OUTPUT |
| DMCON | OUT | DSP MOTOR CONTROL ON: 1-CHIP LSI /CD DSP SERVO SWITCHING SIGNAL |
| MON | OUT | MOTOR ON: MOTOR DRIVER ON |
| SBRK | OUT | SHORT BRAKE: SIGNAL BRAKING MOTOR BY SHORT-CIRCUIT |

FIG. 6

| BIT | CODE | CONTENTS | 1 | 0 | RES |
|---|---|---|---|---|---|
| 7 | TON | TRACKING SERVO ON/OFF | ON | OFF | 0 |
| 6 | TONSEL | TON SIGNAL INPUT/OUTPUT SELECTION | OUTPUT | INPUT | 0 |
| 5 | PWM1H | MPWM OUTPUT PROHIBIT | HIGH-Z OUTPUT | PWM OUTPUT | 0 |
| 4 | LPRESET | FORCED RESET OF LOOP FILTER ACCUMULATION REGISTER | RESET | UNRESET | 0 |
| 3 | PDRESET | FORCED RESET OF WBL SERVO PHASE COMPARATOR | RESET | UNRESET | 0 |
| 2 | DPLMSK | MASK DPLOCK INPUT AT TIME OF AUTOMATIC MODE | MASK | NO MASK | 0 |
| 1..0 | | (RESERVED) | | | |

FIG. 7(A)

| BIT | CODE | CONTENTS | 1 | 0 | RES |
|---|---|---|---|---|---|
| 7..4 | SVMODE | SERVO MODE | AS BELOW | | 0 |
| 3 | | (RESERVED) | | | 0 |
| 2..0 | CRMODE | CURRENT SERVO MODE | READ ACTUAL SERVO MODE AT TIME OF AUTOMATIC MODE | | 0 |

FIG. 7(B)

| BIT 7 | BIT 6 | BIT 5 | BIT 4 | MODE |
|---|---|---|---|---|
| 0 | 0 | 0 | 0 | MOTOR STOP (STOP MODE) |
| 0 | 0 | 0 | 1 | MAXIMUM ACCELERATION (KICK MODE) |
| 0 | 0 | 1 | 0 | MAXIMUM DECELERATION (BRAKE MODE) |
| 0 | 0 | 1 | 1 | CAV CONTROL USING FG PULSE (FG MODE) |
| 0 | 1 | 0 | 0 | MOTOR CONTROL USING WOBBLE SIGNAL (WBL MODE) |
| 0 | 1 | 0 | 1 | MOTOR CONTROL AT TIME OF ENCODING (AX MODE) |
| 0 | 1 | 1 | 0 | MOTOR CONTROL BY FUNCTION OF CD-DSP (DEC MODE) |
| 0 | 1 | 1 | 1 | PREVIOUS VALUE HOLD (HOLD MODE) |

FIG. 7(C)

| BIT 7 | BIT 6 | BIT 5 | BIT 4 | MODE |
|---|---|---|---|---|
| 1 | 0 | 0 | 0 | AUTOMATIC SWITCHING FROM KICK MODE TO FG MODE (KICK TO FG MODE) |
| 1 | 0 | 0 | 1 | AUTOMATIC SWITCHING FROM BRAKE MODE TO STOP MODE (BRAKE TO STOP MODE) |
| 1 | 0 | 1 | 0 | AUTOMATIC SWITCHING BETWEEN FG/DEC MODES (FG/DEC MODE) |
| 1 | 0 | 1 | 1 | AUTOMATIC SWITCHING BETWEEN FG/WBL MODES (FG/WBL MODE) |
| 1 | 1 | 0 | 0 | AUTOMATIC SWITCHING AMONG FG/WBL/DEC MODES (FG/WBL/DEC MODE) |
| 1 | 1 | 0 | 1 | AUTOMATIC SWITCHING FROM WBL MODE TO AX MODE (WBL/AX MODE) |
| 1 | 1 | 1 | 0 | (RESERVED) |
| 1 | 1 | 1 | 1 | (RESERVED) |

FIG. 8

| BIT | CODE | CONTENTS | 1 | 0 | RES |
|---|---|---|---|---|---|
| 7..0 | KICDAT | KICK DATA | SET KICK DATA AT TIME OF KICK, BRAKE MODE. OUTPUT PWM DUTY DEPENDING ON SET KICK DATA AT TIME OF KICK, BRAKE MODE. PWM DUTY BECOMES DUTY ±1 WHEN PWM DATA IS ± 4096. SET VALUE × 16 IS SET AS PWM DATA INTERNALLY. AUTOMATIC CONVERSION INTO A NEGATIVE VALUE AND OPERATION ARE MADE INTERNALLY AT TIME OF BRAKE MODE, SO THAT A POSITIVE VALUE IS SET FOR THE SET VALUE IN BOTH KICK, BRAKE MODES. | | 0 |

FIG. 9(A)

| BIT | CODE | CONTENTS | 1 | 0 | RES |
|---|---|---|---|---|---|
| 7..5 | | (RESERVED) | | | |
| 4 | LPRESEN | LOOP FILTER RESET ENABLE | ENABLE | DISABLE | 0 |
| 3 | KFUPEN | FGKF (TOTAL GAIN) 2-TIMES ENABLE | ENABLE | DISABLE | 0 |
| | FGLOCK | FG LOCKED STATE | LOCKED STATE OF FG SERVO READABLE. THIS BIT BECOMES "1" WHEN SPEED DIFFERENCE BETWEEN TARGET SPEED AND DETECTED SPEED BECOMES ±30% AFTER SETTING TARGET PERIOD IN FGMTH, FGMTL OF SERVO CONTROL REGISTER (0x83, 0x84) | | 0 |
| 1..0 | FGMTH | FG SERVO · TARGET PERIOD (UPPER 2 BITS) | SET TARGET PERIOD OF FG SERVO (0~1023). DRIVING FORCE IS COMPUTED DEPENDING ON DIFFERENCE AND OUTPUT BY FG SERVO, BASED ON DIFFERENCE OF TARGET PERIOD AND DETECTED PERIOD OBTAINED BY COUNTING PERIOD OF FG SIGNAL BY ENCODER EFM FRAME SYNC (EEFS). TARGET PERIOD = 7350×N (Hz) / INTERNAL FG FREQUENCY×N (N=1, 2, 4, 6, 8 TIMES SPEED) IS CALCULATED, AND INTERNAL FG FREQUENCY MUST BE CONSIDERED IF INPUT FG SIGNAL IS USED AS BOTH EDGES OF SERVO CONTROL REGISTER (0x83) OR, FREQUENCY-DIVIDING BY 1/2. | | 0 |

FIG. 9(B)

| BIT | CODE | CONTENTS | 1 | 0 | RES |
|---|---|---|---|---|---|
| 7..0 | FGMTL | FG SERVO · TARGET PERIOD (LOWER 8 BITS) | SET TARGET PERIOD OF FG SERVO (0~1023). DRIVING FORCE IS COMPUTED DEPENDING ON DIFFERENCE AND OUTPUT BY FG SERVO, BASED ON DIFFERENCE OF TARGET PERIOD AND DETECTED PERIOD OBTAINED BY COUNTING PERIOD OF FG SIGNAL BY ENCODER EFM FRAME SYNC (EEFS). TARGET PERIOD = 7350×N (Hz) / INTERNAL FG FREQUENCY×N (N=1, 2, 4, 6, 8 TIMES SPEED) IS CALCULATED. | | 0 |

FIG. 10

| SVMODE | MODE | FUNCTION | MPWM | MPWMP | MPWMN | MON | DMCON |
|---|---|---|---|---|---|---|---|
| 1000 | STOP | MOTOR STOP | Z | Z | Z | L | L |
| 1001 | KICK | MAXIMUM ACCELERATION | PWM | PWM | PWM | H | L |
| 1010 | BREAK | MAXIMUM DECELERATION | PWM | PWM | PWM | H | L |
| 1011 | FG | CAV CONTROL USING FG PULSE | PWM | PWM | PWM | H | L |
| 1100 | WBL | MOTOR CONTROL USING WOBBLE SIGNAL | PWM | PWM | PWM | H | L |
| 1101 | AX | MOTOR CONTROL AT TIME OF ENCODING | PWM | PWM | PWM | H | L |
| 1110 | DEC | MOTOR CONTROL BY FUNCTION OF CD-DSP | Z OR PWM | Z OR PWM | Z OR PWM | H | H |
| 1111 | HOLD | PREVIOUS VALUE HOLD | PWM | PWM | PWM | H | L |

FIG. 11

| SVMODE | MODE | FUNCTION |
|---|---|---|
| 1000 | KICK TO FG | AUTOMATIC SWITCHING FROM KICK MODE TO FG MODE |
| 1001 | BRAKE TO STOP | AUTOMATIC SWITCHING FROM BRAKE MODE TO STOP MODE |
| 1010 | FG/DEC | AUTOMATIC SWITCHING BETWEEN FG/DEC MODES |
| 1011 | FG/WBL | AUTOMATIC SWITCHING BETWEEN FG/WBL MODES |
| 1100 | FG/WBL/DEC | AUTOMATIC SWITCHING AMONG FG/WBL/DEC MODES |
| 1101 | WBL/AX | AUTOMATIC SWITCHING BETWEEN WBL/AX MODES |
| 1110 | (RESERVED) | (RESERVED) |
| 1111 | (RESERVED) | (RESERVED) |

DISK UNIT AND ROTATING MOTOR CONTROL APPARATUS FOR RECORDABLE OPTICAL DISK UNIT

This application is a divisional of U.S. patent application Ser. No. 09/059,589, filed Apr. 14, 1998, now U.S. Pat. No. 6,128,261.

BACKGROUND OF THE INVENTION

The present invention generally relates to optical disk units (hereinafter referred to as recordable optical disk units) for driving recordable optical disks and rotating motor control apparatuses, and more particularly to a recordable optical disk unit and a control circuit and a LSI for a rotating motor control apparatus in the recordable optical disk unit.

Optical disks are used as devices for recording a large amount of information.

A general description will be given of the optical disk and a drive structure.

General CD-R and CD-E are writable (recordable) CDs (compact disks). The CD-R (CD-Recordable) is a once-writable CD (also referred to as CD-Write Once). On the other hand, the CD-E (CD-Erasable) is a multiple-times-writable CD (also referred to as CD-RW or CD-Rewritable).

These optical disks such as the CD-R and the CD-E are used with a drive shown in FIG. 1 when recording and reproducing information.

FIG. 1 is a functional block diagram showing an example of an important structure of an optical disk drive. FIG. 1 shows an optical disk 1, a spindle motor 2, an optical pickup 3, a motor driver 4, a read amplifier 5, a servo means 6, a CD decoder 7, an ATIP decoder 8, a laser controller 9, a CD encoder 10, a CD-ROM encoder 11, a buffer RAM 12, a buffer manager 13, a CD-ROM decoder 14, an ATAPI/SCSI interface 15, a digital-to-analog (D/A) converter 16, a ROM 17, a central processing unit (CPU) 18, a RAM 19, a laser beam LB, and an audio output signal Audio.

In FIG. 1, arrows indicate directions in which data mainly flow. Further, in order to simplify the drawing, only one representative signal line is indicated by a bold line and added to the CPU 18 which controls various parts in FIG. 1, and the illustration of the connections to the various parts is omitted.

The construction and operation of the optical disk drive are as follows.

The optical disk 1 is driven and rotated by the spindle motor 2. This spindle motor 2 is controlled by the motor driver 4 and the servo means 5 so that a linear velocity becomes constant. This linear velocity can be changed in steps.

The optical pickup 3 is built-in with a semiconductor laser, an optical system, a focus actuator, a track actuator, a light receiving element and a position sensor which are not shown, and irradiates the laser beam LB on the optical disk 1. This optical pickup 3 is movable in a sledge direction by a seek motor.

Based on signals obtained by the focus actuator, the track actuator, the seek motor, the light receiving element and the position sensor, the motor driver 4 and the servo means 5 carry out a control so that a spot of the laser beam LB is positioned at a target location on the optical disk 1.

In a read mode, a reproduced signal obtained from the optical pickup 3 is amplified by the read amplifier 5 and input to the CD decoder 7 after being binarized. The input binarized data is demodulated in the CD decoder 7 in accordance with an EFM (Eight to Fourteen Modulation).

Recorded data is modulated by the EFM in units of 8 bits, and according-to the EFM, 8 bits are converted into 14 bits and a total of 17 bits are obtained by adding 3 coupling bits. In this case, the coupling bits are added so that the number of "1"s and the number of "0"s become the same on an average. This is called "D.C. component suppression", and a slice level deviation of the reproduced signal is suppressed by cutting the D.C. component of the reproduced signal.

The demodulated data is subjected to a deinterleaving process and an error correction process. Thereafter, the data is input to the CD-ROM decoder 14 so as to improve the data reliability, and an error correction process is then carried out.

The data subjected to the two error correction processes is temporarily stored in the buffer RAM 12 by the buffer manager 13. The stored data when completed as sector data, is transferred in one operation to a host computer which is not shown, via the ATAPI/SCSI interface 15. In the case of musical data, the data output from the CD decoder 7 is input to the D/A converter 16 and obtained as an analog audio output signal Audio.

In a write mode, the data obtained from the host computer via the ATAPI/SCSI interface 15 is temporarily stored in the buffer RAM 12 by the buffer manager 13. The write operation is started in a state where a certain amount of data is stored in the buffer RAM 12, and in this case, it is necessary to first position the laser beam spot to a write starting point. This write starting point is obtained by a wobble signal which is prerecorded on the optical disk 1 by the zigzag of the track.

Absolute time information called ATIP is included in the wobble signal, and this absolute time information is obtained by the ATIP decoder 8. In addition, a synchronizing signal generated by the ATIP decoder 8 is input to the CD encoder 10, thereby making it possible to write the data at an accurate position on the optical disk 1.

The data stored in the buffer RAM 12 is subjected to a process of adding an error correction code and an interleaving process in the CD-ROM encoder 11 and the CD encoder 10, and is recorded on the optical disk 1 via the laser controller 9 and the optical pickup 3.

The EFM data drives the laser as a bit stream at a channel bit rate of 4.3218 Mbps (standard rate). The recording data in this case forms an EFM frame in units of 588 channel bits. A channel clock refers to a clock having a frequency of the channel bits.

The general construction and operation of the optical disk drive shown in FIG. 1 are as described heretofore.

A spiral guide groove is formed in the MD (mini disk), the CD-R (CD recordable: compact disk that can be written once), and the CD-E (CD erasable: compact disk that is erasable and writable a plurality of times). This guide groove makes a zigzag in a radial direction of the disk by an extremely small amount (for example, on the order of 0.03 $\mu$m) at a constant spatial frequency (for example, 17,00 cycles/m: 1 period per 59 $\mu$m) so that the rotation can be controlled to a CLV (Constant Linear Velocity).

When the drive drives the rotating motor so that this zigzag signal frequency becomes constant (for example, 22.05 kHz), it is possible to rotate the disk at a constant linear velocity (for example, 1.3 m/s).

Therefore, the guide grooves makes a zigzag, and a disk unit which controls the rotation of the disk by detecting the zigzag signal frequency is known (for example, Japanese Laid-Open Patent Application No. 6-338066).

In addition, address information is frequency modulated (FM) and multiplexed to the zigzag signal frequency.

For example, the information "1" is modulated to 23.05 kHz, and the information "0" is modulated to 20.05 kHz.

Since the number of the information "1" and the number of the information "0" mare made the same on the average, the CLV control is actually set so that an average frequency of the zigzag signal becomes 22.05 kHz.

The address information is called ATIP (Absolute Time In Pre-groove). Moreover, the zigzag signal is called wobble signal. This wobble signal is a carrier signal of the ATIP.

An apparatus which obtains an address signal from a carrier wave modulation component by carrying out a CLV control by controlling the rotation so that the carrier wave of the zigzag groove becomes constant, is also known (for example, Japanese Laid-Open Patent Application No. 5-225580).

A 1-chip LSI which is used in the optical disk drive such as the CD-R drive, for example, is already on the market (for example, LC89590 manufactured by Sanyo Electric Company Limited of Japan and materials related to the explanation and application thereof).

Therefore, a circuit which carries out the CLV control in synchronism with the wobble signal, and a circuit which carries out the CLV control in synchronism with the address synchronizing signal (ATIPSYNC) of the ATIP, are both known as conventional techniques.

However, according to these conventional techniques, there is no disclosure as to the relationship of a rotation control circuit which is used when reproducing signals from a reproducing disk and a rotation control circuit which is used when rotating a recording disk.

Furthermore, the conventional techniques do not teach a rotation control in a data region which is partially recorded on the recording disk.

As described above under prior art, a circuit which carries out the CLV control in synchronism with the wobble signal, and a circuit which carries out the CLV control in synchronism with the address synchronizing signal (ATIPSYNC) of the ATIP, are both known as conventional techniques.

However, in the region of the recording disk recorded with the data, the wobble signal cannot be detected accurately in some cases because the wobble signal is distorted by the recorded data. For this reason, there is a problem in that the rotation control easily becomes unstable when the rotation control is continuously carried out using the wobble signal.

In order to improve a signal-to-noise (S/N) ratio of the wobble signal, the wobble signal must in general be detected via a narrow band bandpass filter (BPF). But when the target linear velocity is not yet reached, such as when making an access and starting the rotation, the wobble signal is in a state shifted from the passband of the bandpass filter and the wobble signal cannot be detected accurately.

Accordingly, there is a problem in that the rotation control easily becomes unstable in such cases.

Furthermore, it is also known to set a mode for controlling the rotation in synchronism wit the address synchronizing signal (ATIPSYNC) (above described LC89590 manufactured by Sanyo Electric Company Limited of Japan and materials related to the explanation and application thereof).

This mode is added because the wobble signal cannot be completely synchronized to the address information due to a bit slip or the like according to the rotation control using the wobble signal.

But since the address synchronizing signal (ATIPSYNC) has a low frequency of 75 Hz, the rotation control cannot be made in the high band, and there is an inconvenience in that a fine control is difficult to achieve.

In addition, according to the rotation control described above, an instruction from a CPU (microcomputer) or an external circuit must be used in general to switch the mode among a control mode of the reproducing disk, a control mode of a wobble signal, a control mode of an address synchronizing signal (ATIPSYNC), and the like. As a result, there are various problems in that the programming is difficult to perform, and the cost of the system increases due to the need for the external circuit.

SUMMARY OF THE INVENTION

Accordingly, it is a general object of the present invention to provide a novel and useful rotating motor control apparatus for recordable optical disk unit, in which the problems described above are elminated.

Another and more specitic object of the present invention is to realize a rotating motor control apparatus for an optical disk, which can always carry out a stable and fine rotation control, by effectively and automatically switching the mode among such various modes.

In addition, another object of the present invention is to provide a rotating motor control apparatus with reduced cost and reduced programming load.

Still another object of the present invention is to provide a rotating motor control apparatus for a recordable optical disk unit comprising a data synchronizing rotation control circuit controlling rotation of a rotating motor in synchronism with a recorded data signal, a zigzag synchronizing rotation control circuit controlling the rotation of the rotating motor in synchronism with a zigzag of a guide groove of a disk, a phase synchronizing circuit synchronizing to a phase of the data signal, and a synchronous detection circuit detecting a synchronized state of the phase synchronizing circuit and outputting a lock signal, where the data synchronizing rotation control circuit drives the rotating motor when the lock signal is obtained, and the zigzag synchronizing rotation control circuit drives the rotating motor when no lock signal is obtained. According to the rotatingmotor control apparatus of the present invention, it is possible to automatically switch between the zigzag synchronizing rotation control mode and the data synchronizing rotation control mode, without putting a load on the CPU which forms the controller, and a stable control mode can be obtained even if a recorded portion and an unrecorded portion coexist on the disk. Moreover, since there is no load on the CPU, it is possible to reduce the code size of the firmware, thereby making it possible to reduce the cost and to easily realize a high-speed rotation.

A further object of the present invention is to provide a rotating motor control apparatus for a recordable optical disk unit comprising a data synchronizing rotation control circuit controlling rotation of a rotating motor in synchronism with a recorded data signal, a phase synchronizing circuit synchronizing to a phase of the data signal, a synchronous detection circuit detecting a synchronized state of the phase synchronizing circuit and outputting a lock signal, frequency generating means for outputting a FG signal having a frequency proportional to a rotational speed of the rotating motor, and a FG rotation control circuit controlling the motor to a predetermined rotational speed depending on the FG signal, where the data synchronizing rotation control circuit drives the rotating motor when the lock signal is obtained, and the FG rotation control circuit drives the rotating motor when no lock signal is obtained. According to the rotating motor control apparatus of the present invention, in a case where the data synchronization cannot be achieved in a transient state such as during a variable speed upon access, the FG control mode is automatically selected. On the other hand, when the data synchronization is achieved, the mode is set to the data synchronizing rotation control mode, and it is possible to also obtain effects similar to those obtainable by the rotating motor control apparatus of claim 1 described above.

Another object of the present invention is to provide a rotating motor control apparatus for a recordable optical disk unit comprising a data synchronizing rotation control circuit controlling rotation of a rotating motor in synchronism with a recorded data signal, frequency generating means for outputting a FG signal having a frequency proportional to a rotational speed of the rotating motor, and a FG rotation control circuit controlling the motor to a predetermined rotational speed depending on the FG signal, where the data synchronizing rotation control circuit drives the rotating motor when a light beam of an optical disk unit is in a tracking state where a track of the disk is tracked, and the FG rotation control circuit otherwise drives the rotating motor. According to the rotating motor control apparatus of the present invention, even during the access, it is possible to automatically switch to the data synchronizing rotation control mode after stable data is obtained, and it is possible to also obtain effects similar to those obtainable by the rotating motor control apparatus of claim 1 described above.

The rotating motor control apparatus may further be provided with a synchronous detection circuit detecting a synchronized state of the phase synchronizing circuit and outputting a lock signal, where the data synchronizing rotation control circuit drives the rotating motor when the light beam of the optical disk unit is in the tracking state where a track of the disk is tracked and the lock signal is obtained, and the FG rotation control circuit otherwise drives the rotating motor. By setting the conditions for automatically switching the mode in this manner, it is possible to-switch to the DEC mode after the recorded data (EFM) signal obtained completely stabilizes. Hence, it is possible to further stabilize the operation.

Still another object of the present invention is to provide a rotating motor control apparatus for a recordable optical disk unit comprising a zigzag synchronizing rotation control circuit controlling a rotation of a rotating motor in synchronism with a zigzag of a guide groove of a disk, frequency generating means for outputting a FG signal having a frequency proportional to a rotational speed of the rotating motor, and a FG rotation control circuit controlling the motor to a predetermined rotational speed depending on the FG signal, where the FG rotation control circuit drives the rotating motor when the frequency of the FG signal is outside a predetermined range, and the zigzag synchronizing rotation control circuit drives the rotating motor when the frequency of the FG signal is within the predetermined range. Accordingly to the rotating motor control apparatus of the present invention, it is possible to always stably control the rotation during the access on the recordable disk, and it is possible to also obtain effects similar to those obtainable by the rotating motor control apparatus of claim 1 described above.

The rotating motor control apparatus may further be provided with a frequency comparator comparing the frequency of the FG signal and a target frequency of the FG rotation control circuit, a phase comparator comparing a phase of a zigzag signal and a phase of a reference signal of the zigzag synchronizing rotation control circuit, and an accumulator accumulating a comparison result of one of the two comparators, where the FG rotation control circuit drives the rotating motor depending on an output of the frequency comparator and a product obtained by accumulating the comparison result to the output of the frequency comparator, the zigzag synchronizing rotation control circuit drives the rotating motor depending on an output of the phase comparator and a product obtained by accumulating the comparison result to the output of the phase comparator. In this case, it is possible to use a loop filter in common between two control modes, thereby reducing the cost of the circuit. Further, since the accumulated values can be succeeded, the control at the time of switching the mode stabilizes.

The rotating motor control apparatus may further be provided with a phase synchronizing circuit synchronizing to a phase of the data signal, and a synchronous detection circuit detecting a synchronized state of the phase synchronizing circuit and outputting a lock signal, where the data synchronizing rotation control circuit drives the rotating motor when the lock signal is obtained, the FG rotation control circuit driving the rotating motor when no lock signal is obtained and the frequency of the FG signal is outside the predetermined range, and the zigzag synchronizing rotation control circuit drives the rotating motor when no lock signal is obtained and the frequency of the FG signals is within the predetermined range. In this case, the mode is automatically switched and a stable control is always set even in the case of a disk on which a recorded portion and an unrecorded portion coexist. Hence, the load on the CPU is reduced, and a high-speed rotation becomes possible.

The rotating motor control apparatus may further be provided with a kick mode setting means for setting a kick mode in which the rotating motor is accelerated at a predetermined power, where the FG rotation control circuit controls the rotating motor when the rotating motor is accelerated from a stopped state by the kick mode and a FG signal pulse reaches a predetermined rotational speed. In this case, it is possible to make a stable start without increasing the load on the CPU.

The rotating motor control apparatus may further be provided with brake mode setting means for setting a brake mode in which the rotating motor is driven in a reverse direction at a predetermined power, where driving of the rotating motor is stopped when the rotating motor is decelerated from a rotating state by the brake mode and a reverse rotation of the rotating motor is detected. In this case, it is possible to eliminate the inconvenience in that the load on the CPU would increase if the deceleration were controlled by the CPU, and the motor can be stably stopped.

The rotating motor control apparatus may further be provided with short-circuit brake signal output means for generating a brake signal which short-circuits coils of the rotating motor, where the short-circuit brake signal is output only when the frequency of the FG signal is higher than a target value by a predetermined range. In this case, it is possible to realize a deceleration control with a small power consumption, without increasing the load on the CPU.

A further object of the present invention is to provide a rotating motor control apparatus for a recordable optical disk unit comprising a zigzag synchronizing rotation control circuit controlling a rotation of a rotating motor in synchronism with a zigzag of a guide groove of a disk, a synchronizing signal detection circuit detecting an address synchronizing signal arranged as the zigzag of the guide groove for every predetermined distance in a linear direction of the guide groove, and an address synchronizing rotation control circuit controlling the rotation of the rotating motor in synchronism with the address synchronizing signal, where the zigzag synchronizing rotation control circuit drives the rotating motor up to a predetermined position in front of a recording start address, and the address synchronizing rotation control circuit drives the rotating motor from the predetermined position in front of the recording start position. According to the rotating motor control apparatus of the present invention, it is possible to carry out a high-speed control by the zigzag synchronizing rotation control up to the start of the recording, and the address synchronization is achieved during the recording. For this reason, it is possible to carry out a fine recording control, in addition to obtaining effects similar to those described above.

The address synchronizing rotation control circuit comprises a phase comparator may compare phases of the address synchronizing signal and a reference clock signal, and a variable frequency oscillator may output a frequency dependent on a comparison result of the phase comparator, where the zigzag synchronizing rotation control circuit is coupled to control the rotation of the rotating motor in synchronism with the zigzag of the guide groove by using the output of the variable frequency oscillator as a reference input. In this case, it is possible to carry out an address synchronization control while maintaining the high-speed control of the zigzag synchronizing rotation control mode. In addition, it is possible to realize the AX mode by using the WBL mode system in common between the AX and WBL modes. Even during the AX mode, the WBL mode system is synchronized to the wobble signal and closed, thereby making it possible to carry out the control in the high-frequency region.

The zigzag synchronizing rotation control circuit may drive the rotating motor after the recording ends. In this case, it is possible to automatically return to the WBL mode after the recording ends, without putting a load on the CPU.

Another object of the present invention is to provide a recordable optical disk unit which is provided with any of the rotating motor control apparatuses referred above, which is further provided with a data synchronizing rotation control circuit controlling the rotation of the rotating motor in synchronism with a recorded data signal, a phase synchronizing circuit synchronizing to a phase of the data signal, and a synchronous detection circuit detecting a synchronized state of the phase synchronizing circuit and outputting a lock signal, are built into a first digital signal processing LSI, and other processing means are built into a second digital signal processing LSI. According to the recordable optical disk unit of the present invention, by employing such a construction, the control itself of the DEC mode can be entrusted to the CD-DSP, and the functions related to the DEC mode control do not need to be built into the CD-R LSI chip. Hence, the cost of the CD-R LSI chip for control can be reduced. In addition, by the automatic switching of the control mode, it is possible to always carry out a stable rotation control, without increasing the load on the CPU associated with the switching. Hence, the firmware size and cost can be reduced. Consequently, the cost of the entire optical disk unit can be reduced, and a high-speed unit can be realized.

Other objects and further features of the present invention will be apparent from the following detailed description when read in conjunction with the accompanying drawings.

BRIEF DESCRIPTION OF THE DRAWINGS

FIG. 5 is a diagram showing interface signals at a rotating motor control apparatus shown in FIG. 3;

FIG. 6 is a diagram showing an embodiment of a signal TON register and a signal DPLMSK register;

FIGS. 7(A), 7(B) and 7(C) are diagrams showing an embodiment of a signal SVMODE register;

FIG. 8 is a diagram showing an embodiment of a signal KICDAT register;

FIGS. 9(A) and 9(B) are diagrams showing an embodiment of a signal FGMTH register and a signal FGMTL register;

FIG. 10 is a diagram showing a setting of a manual mode with respect to a servo mode of a spindle motor;

FIG. 11 is a diagram showing a setting of an automatic mode with respect to the servo mode of the spindle motor;

DESCRIPTION OF THE PREFERRED EMBODIMENTS

First, a description will be given of a 1-chip LSI which accommodates a rotating motor control apparatus for a recordable optical disk unit according to the present invention, that is, a 1-chip LSI which has functions for a drive unit of a recordable optical disk, namely, a CD-R disk, integrated therein.

Figure 3:
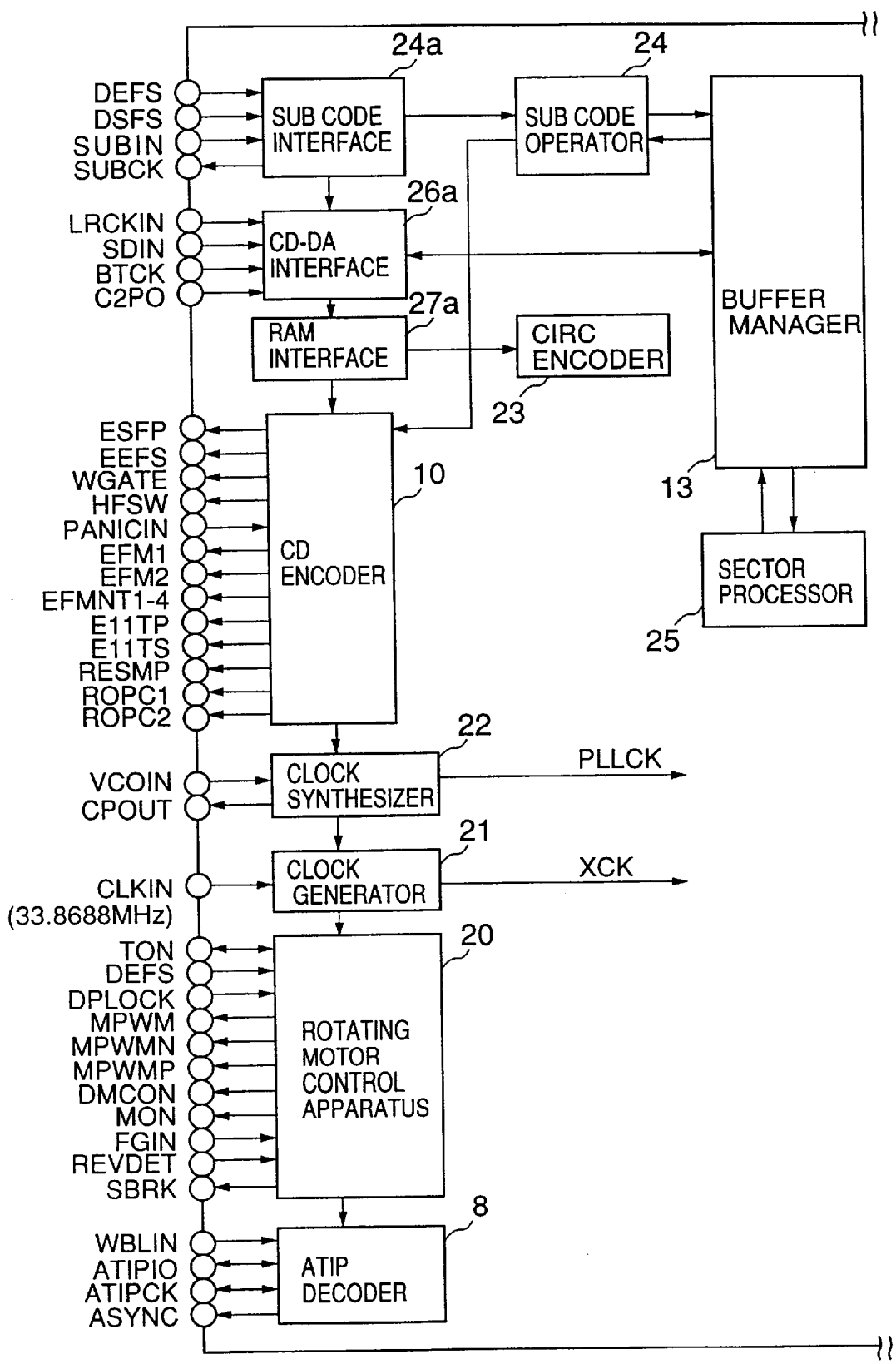
FIG. 3 is a functional block diagram showing an embodiment of the construction of an important part of a 1-chip LSI in which functions for a CD-R disk drive unit are integrated.
Figure 4:
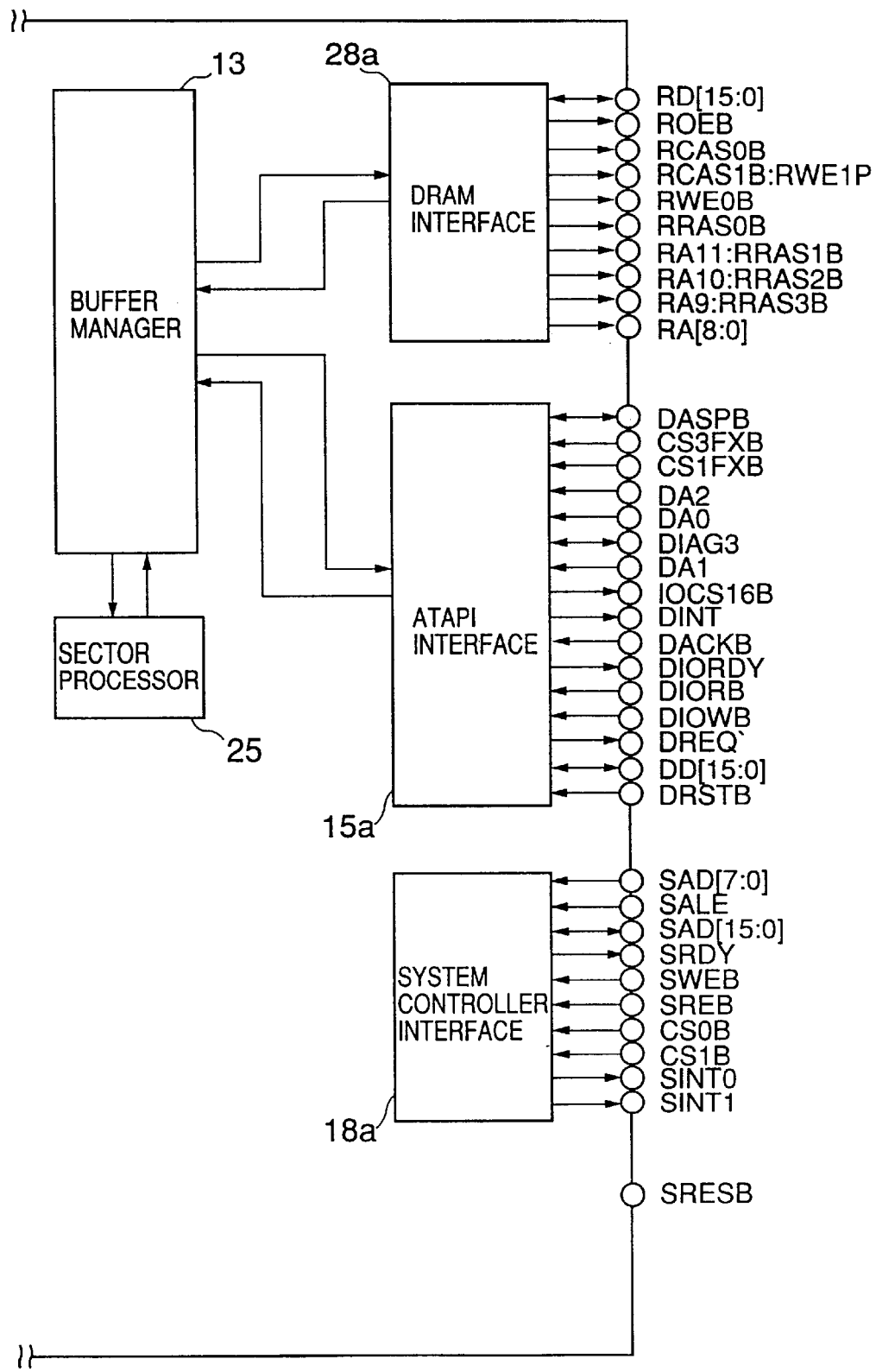
FIG. 4 is a functional block diagram showing an embodiment of the construction of the 1-chip LSI in which the functions of the CD-R disk drive unit are integrated.

FIGS. 3 and 4 are functional block diagrams showing important structures of a 1-chip LSI having the functions for the CD-R disk drive unit integrated thereof. In FIGS. 3 and 4, similar designations are used as in FIG. 1, and interfaces are designated by the same reference numerals as in FIG. 1 with a suffix "a". FIGS. 3 and 4 show a rotating motor control apparatus 20, a clock generator 21, a clock synthesizer 22, a CIRC encoder 23, a sub code operator 24, a sector processor 25, a CD-DA interface 26a, a RAM interface 27a, and a DRAM interface 28a.

Figure 1:
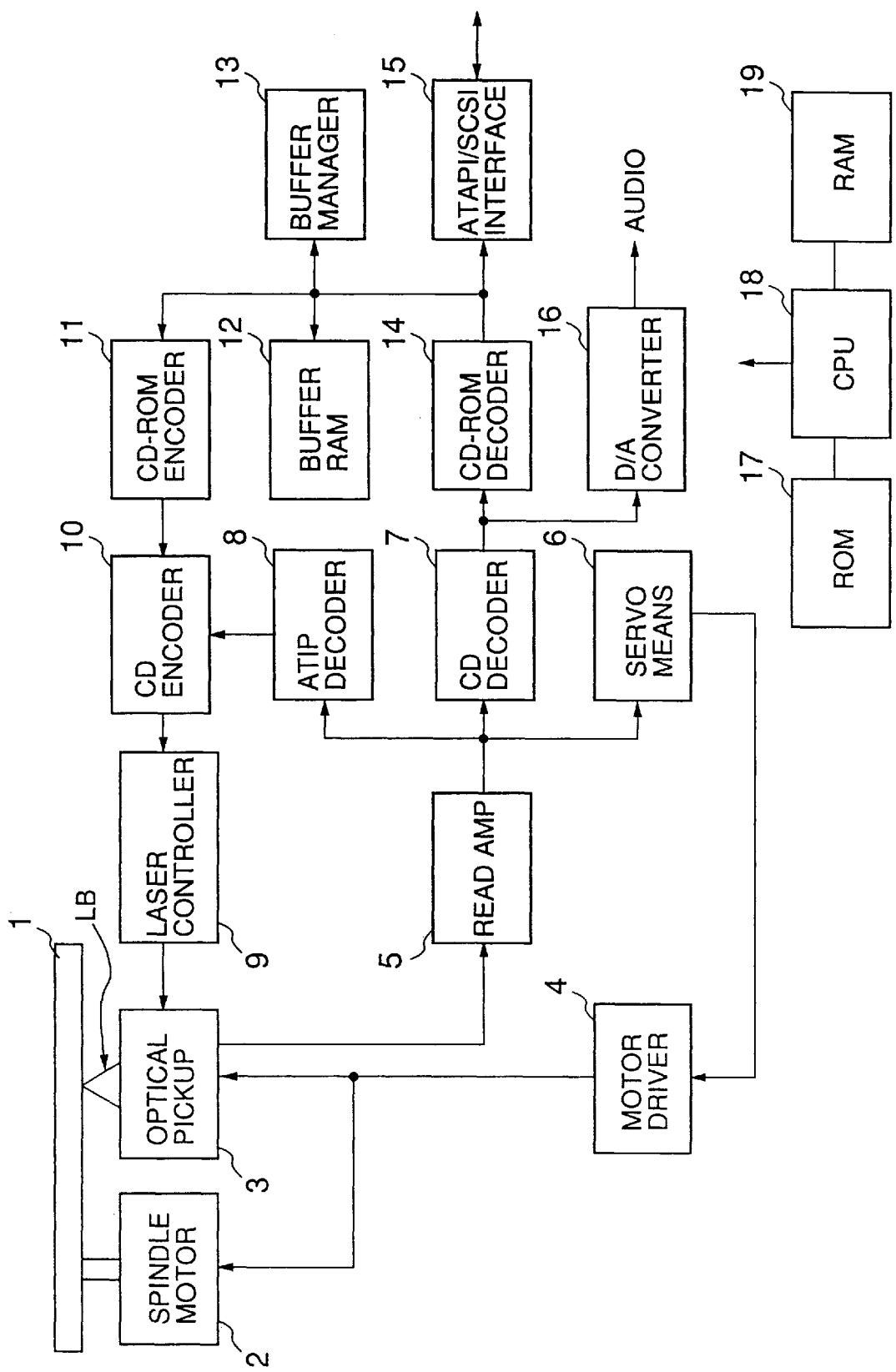
FIG. 1 is a functional block diagram showing an example of the construction of an important part of an optical disk drive.

The 1-chip LSI having the functions for the CR-R disk drive unit shown in FIGS. 3 and 4 primarily has, out of the functional blocks of the optical disk drive shown in FIG. 1, the blocks related to the EFM encoding function and the CD-ROM encoding/decoding function and the block related to the rotational motor control apparatus 20 which controls the drive of the motor driver 4, in the form of the LSI.

The general construction and basic operating principles of the blocks forming the CD-R disk drive unit are similar to those blocks of the conventional optical disk drive. But as will be described hereunder in conjunction with first through fourteenth embodiments, the present invention is characterized by the rotating motor control apparatus 20 which controls the drive of the motor driver 4.

A general description will be given of the 1-chip LSI which includes the rotating motor control apparatus according to the present invention.

In FIGS. 3 and 4, a sub code interface 24a, a CD-DA interface 26a, a CD encoder 10, a buffer manager 13, a sector processor 25, a DRAM interface 28a, an ATAPI interface 15a, and a system controller interface 18a form a read/write data processing circuit.

The system controller interface 18a includes a group of registers which are used to write an instruction from the CPU 18 shown in FIG. 1 with respect to the 1-chip LSI and to read an internal state of the 1-chip LSI.

The rotating motor control apparatus of the present invention is integrated in the rotating motor control apparatus 20 shown on the lower part of FIG. 3.

Pin assignments (interface signals for the motor control) related to the rotating motor control apparatus 20 are shown in detail in FIG. 5.

FIG. 5 is a diagram showing the interface signals at the rotating motor control apparatus 20 shown in FIG. 3.

A reverse detect signal REVDET indicates that the motor has started a reverse rotation.

A DSP PLL lock signal DPLOCK indicates a locked state of a PLL of the CD-DSP (CD digital signal processor circuit).

A FG in signal FGIN has a frequency proportional to the rotational-speed of the motor.

A tracking servo ON signal TON indicates that a light beam is tracking a track on the disk.

A motor PWM signal MPWM is represented by a motor PWM positive signal MPWMP and a motor PWM negative signal MPWMN thereof.

A DSP motor control ON signal DMCON switches a CD-DSP servo of the 1-chip LSI shown in FIGS. 3 and 4.

A motor ON signal MON indicates motor driver ON.

A short brake signal SBRK is used to short-circuit the coils of the motor and to brake the motor.

A description of the instruction related to the rotating motor control apparatus 20 and status registers will be given later in conjunction with FIGS. 6 through 9. A number of 8-bit registers which are necessary (for example, 13 in total) are provided.

Particularly, a servo control register which will be described in conjunction with the embodiment has addresses 0x80 to 0x84 (0x indicates a hexadecimal representation).

FIG. 6 is a diagram showing a signal TON register and a signal DPLMSK register.

First, the signal TON register stores the signal TON in a bit 7 of an address 0x80.

This bit 7 is set to "1" when the tracking servo is ON, and this bit 7 is set to "0" when the tracking servo is OFF.

For example, an automatic switching by a FG/DEC or FD/WBL automatic mode which will be described later is carried out depending on the ON/OFF state of the tracking servo.

In addition, a forced search of the ATIP decoding is started by the ON state of the tracking servo, and a timing of the CD encoder is initialized at the time of detecting the synchronization.

Next, the signal DPLMSK register stores the signal DPLMSK i a bit 2 of the address 0x80.

This signal DPLMSK is a bit for setting whether or not to include the signal DPLOCK in the switching judging conditions for judging the switching at the time of the automatic mode.

When this bit 2 is set to "1", the signal DPLOCK is not included in the switching judging conditions for judging the switching at the time of the automatic mode, an automatic mode (FG/DEC mode or FC/WBL/DEC mode) including the DEC mode becomes valid, and only the signal TON is included in the switching judging conditions.

On the other hand, when the bit 2 is set to "0", the signal DPLOCK is included in the switching judging conditions.

FIG. 7 is a diagram showing a servo mode signal SVMODE register, where (A) shows a spindle servo mode, (B) shows a manual mode, and (C) shows an automatic mode.

This servo mode signal SVMODE register stores the signal SVMODE in bits 7 through 4 at an address 0x81.

The details for the manual mode are shown in FIG. 7(B), and the details for the automatic mode are shown in FIG. 7(C).

In the case of the automatic mode, 8 modes can be set as shown in FIG. 7(C), and in this particular case, 6 modes are set a shown.

When the contents set in the bits 7 through 4 of the signal SVMODE register are "1000", an automatic switching is made from the kick mode to the FG mode (eigth embodiment).

On the other hand, when the contents set in the bits 7 through 4 of the signal SVMODE register are "1001", an automatic switching is made from the brake mode to the stop mode (ninth embodiment).

An automatic switching is made to other modes in other cases, but a description of each will be given later in conjunction with the embodiments.

FIG. 8 is a diagram showing a kick data signal KICDAT register.

The kick data signal KICDAT register stores a kick data signal KICDAT in bits 7 through 0 at an address 0x82.

This kick data signal KICDAT register is used to set a kick data at the time of the kick mode and at the time of the brake mode.

FIG. 9 is a diagram showing a signal FGMTH register and a signal FGMTL register. In FIG. 9, (A) shows the signal FGMTH register, and (B) shows the signal FGMTL register.

FIG. 9(A) shows a case where the signal FGMTH register is set in the bits 4 through 0.

FIG. 9(B) shows a case where the signal FGMTL register is set in the bits 7 through 0.

A more detailed description of the signal FGMTH register and the signal FGMTL register will be given later in conjunction with the embodiments.

As shown in FIGS. 6 through 9, the instructions related to the rotating motor control apparatus 20 provided in the 1-chip LSI shown in FIG. 3 can be set in the bits 7 through 0 of the status registers.

Next, a general description will be given of a hardware construction and functions of the rotating motor control apparatus for the optical disk unit according to the present invention.

Figure 2:
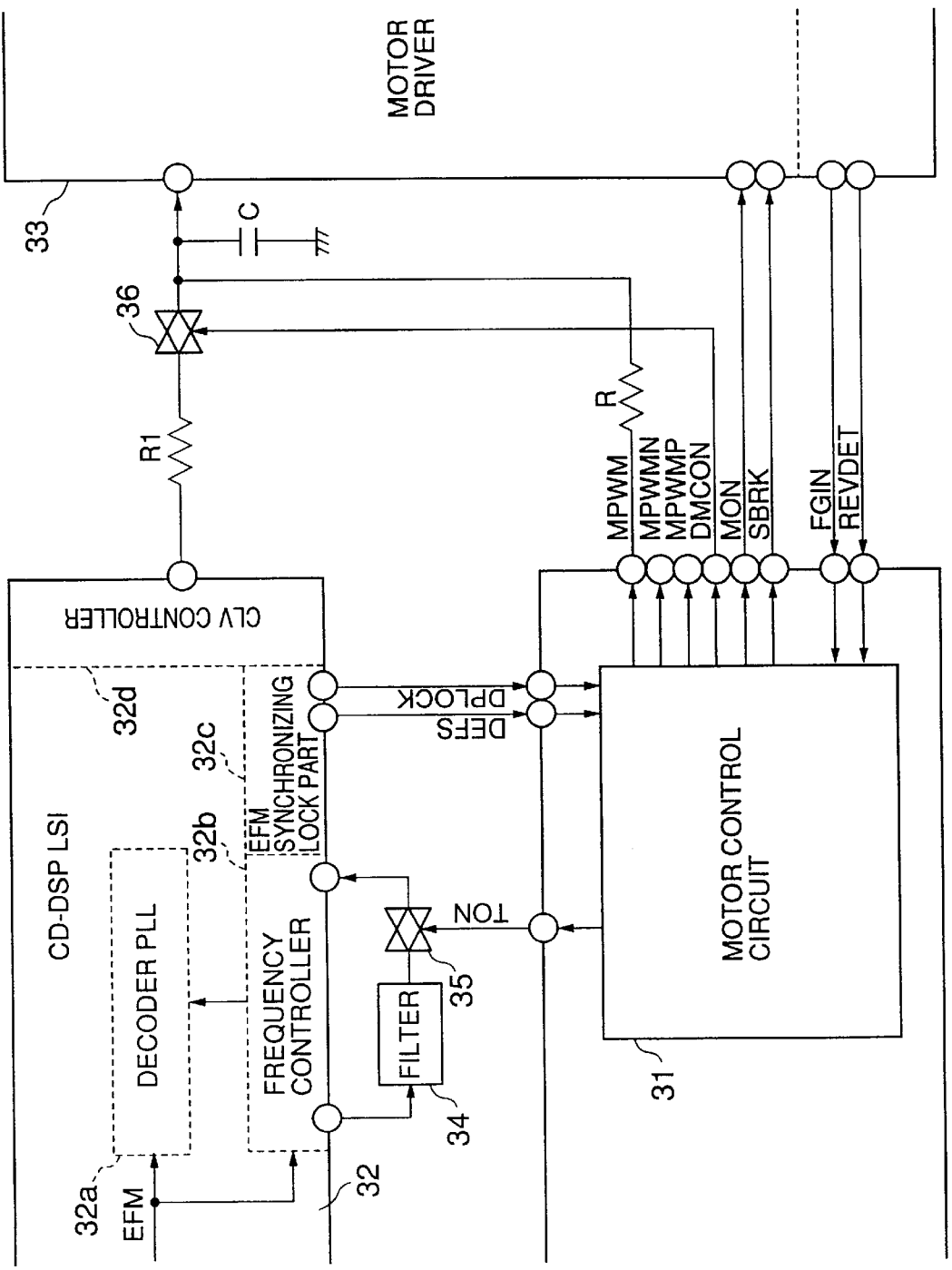
FIG. 2 is a functional block diagram showing an embodiment of the construction of an important part of a rotating motor control apparatus for an optical disk according to the present invention.

FIG. 2 is a functional block diagram showing an embodiment of the construction of an important part of the rotating motor control apparatus for the optical disk unit according to the present invention. In FIG. 2, the same designations are used as in FIGS. 3 and 4. FIG. 2 shows a motor control circuit 31, a CD-DSP LSI 32, a decoder PLL 32a, a frequency controller 32b, an EFM synchronizing lock part 32c, a CLV controller 32d, a motor driver 33, a filter 34, a switch 35, an intermediate switch 36, a capacitor C and resistors R and R1.

The CD-DSP LSI 32 shown at the top left in FIG. 2 is provided with the function of inputting data EFM from the disk and decoding the data when reproducing information from a recorded portion of a reproducing CD or a recordable CD. By noting on the function of the CD-DSP LSI 32, the CD-DSP LSI 32 will hereinafter simply be referred to as the CD-DSP 32.

This CD-DSP 32 also has a CLV control function for maintaining the linear velocity of the disk constant.

This CLV control function is realized by comparing the phases and frequencies of a clock output from a PLL (decoder PLL) circuit which synchronizes the phase to a reproduced data signal EFM and a reference frequency signal, and driving the rotating motor depending on a comparison result.

Alternatively, the rotating motor may be driven so that a period of a specific synchronizing pattern included in the reproduced data signal EFM matches a period of a reference frequency.

Furthermore, the rotating motor may be driven so that a maximum inversion interval of the reproduced data signal EFM matches the period of the reference frequency, by utilizing the fact that the maximum inversion interval of the reproduced data signal EFM has a certain period (11T: approximately 2.5 $\mu$s at a standard speed).

In other words, it is sufficient as long as the rotating motor is controlled in synchronism with the data signal recorded on the disk.

The CD-DSP 32 described above is already on the market and is readily available.

In FIG. 2, a rotating motor driving output of the CD-DSP 32 is output from the CLV controller 32d which forms a "CLV block", and is input to the motor driver 33.

The intermediate switch 36, the resistor R and the capacitor C are provided as shown. The resistor R and the capacitor C are provided generally because the output of the CD-DSP 32 is a PWM (Pulse Width Modulated) digital signal. In other words, the PWM digital signal output from the CD-DSP 32 is converted into an analog signal by a lowpass filter which is formed by the resistor R and the capacitor C.

The ON/OFF state of the intermediate switch 36 is controlled by a signal DMCON (Decoder Motor Control ON) from the motor control circuit 31.

When the intermediate switch 36 is ON, the motor driver 33 is driven by a CLV output of the CD-DSP 32. On the other hand, the motor driver 33 is driven by a motor control output MPWM when the intermediate switch 36 is OFF.

In this case, when the intermediate switch 36 becomes ON, the motor control output MPWM assumes a high-impedance state so as not to collide with the control output of the CD-DSP 32.

A signal DPLOCK (Decoder PLL Lock) which indicates that the PLL synchronized to the data EFM signal is locked is output from the CD-DSP 32 and input to the motor control circuit 31.

The motor control circuit 31 switches the motor control mode depending on the signal DPLOCK.

For example, the signal DPLOCK is designed to become active when the synchronizing pattern included in the data EFM is continuously detectable.

A signal SBRK is used to short-circuit the coils of the motor and to brake the motor. This signal SBRK is input to the motor driver 33.

A signal FGIN has a frequency proportional to the rotational speed of the motor, and is generally output from the motor driver 33.

A signal REVDET indicates that the rotation of the motor is reversed, and this signal REVDET is generally output also from the motor driver 33.

In general, a 3-phase brushless motor is used for the rotating motor of the CD-ROM or CD-R disk unit.

In the 3-phase brushless motor, the driving coils are provided in 3 phases, and a rotary torque is generated by successively supplying 3-phase currents to these coils.

The rotary angle of the motor is detected by a Hall element or the like in order to carry out the switching of the currents. A signal having a frequency proportional to the rotational speed of the motor is obtained from the Hall element or the like.

This signal obtained from the Hall element or the like is called a FG (Frequency Generator) signal. The FG signal which is input is called a signal FGIN. Generally, a signal which is obtained by shaping the waveform of the FG signal by a driver IC is used as the signal FGIN.

When the ends of the 3-phase coils of the motor are all connected (short-circuited), the motor stops, and this is called short-circuit braking.

Further, generally, two or three Hall elements or the like are provided, and the rotating direction of the motor is detected from a phase relationship of the outputs of the Hall elements or the like.

The signal REVDET utilizes this phase relationship.

Other signals are not directly related to the rotating motor control apparatus of the present invention, and a description thereof will be omitted.

The general construction and functions of the rotating motor control apparatus 31 for the optical disk according to the present invention shown in FIG. 2 are as described above.

Next, a description will be given of control modes which can be set in the rotating motor control apparatus 31 of the present invention.

The setting of the servo mode of the spindle motor is made by the signal SVMODE register shown in FIG. 7(A) described above. In other words, this servo mode signal SVMODE register stores the signal SVMODE in the bits 7 through 4 at the address 0x81.

FIG. 10 is a diagram showing the setting of the manual mode with respect to the servo mode of the spindle motor.

As shown in FIG. 10, 8 kinds of manual modes can be set. In a motor stop (STOP) mode, the signal DMCON has a low level (switch OFF), the signal MPWM has a high-impedance (Z) state, and the motor is not driven.

In a kick acceleration (KICK) mode, the motor is accelerated at a predetermined power. In this case, the predetermined power can be specified by a register 0x82 (KICDAT register shown in FIG. 8).

In a brake (BRAKE) mode, the motor is decelerated at a predetermined power. In this case, the predetermine power can also be specified by the register 0x82 (KICDAT register shown in FIG. 8).

In a FG mode, a CAV (Constant Angular Velocity) control using pulse input of the signal FGIN is carried out, and a motor control output signal MPWM is output depending on a difference between the period of the signal FGIN and a target period, so as to control the period of the signal FGIN to match the target period.

In a WBL mode, the rotating motor is rotated in synchronism with a wobble signal which is a zigzag signal of the guide groove of the CD-R disk.

In an AX mode, the rotating motor is rotated in phase synchronism with a synchronizing signal (ATIP Sync) which is included with a constant period in a signal STIP (address information signal) that is frequency modulated in the wobble signal.

In a DEC mode, the rotating motor is rotated by the CLV control (control for maintaining the linear velocity of the disk constant) of the CD-DSP 32 described above.

In a HOLD mode, a previous value holding is carried out, but a description will be omitted since this mode is not directly related to the rotating motor control apparatus of the present invention.

The contents of the manual mode in the servo mode of the spindle motor are as described above.

FIG. 11 is a diagram showing the setting of an automatic mode with respect-to the servo mode of the spindle motor.

In a KICK to FG mode, an automatic switching is made from the kick acceleration (KICK) mode to the FG mode.

In a BRAKE to STOP mode, an automatic switching is made from the brake (BRAKE) mode to the stop (STOP) mode.

In a FG/DEC mode, an automatic switching is made between the FG/DEC modes, and the switching of the FG/DEC modes are made depending on predetermined conditions.

In a FG/WBL mode, an automatic switching is made between the FG/WBL modes, and the switching of the FG/WBL modes are made depending on predetermined conditions.

In a FG/WBL/DEC mode, an automatic switching is made among the FG/WBL/DEC modes (first embodiment).

In a WBL/AX mode, an automatic switching is made between the WBL/AX modes, and the switching of the WBL/AX modes are made depending on predetermined conditions.

These servo modes can be set manually from the CPU so as to control the motor rotation in the respective modes. But the present invention is further characterized in that the switching of these modes can be set in the automatic mode, so as to simplify the programming and to improve the stability of the control operation.

First Embodiment

The first embodiment forms the basis of the present invention.

This first embodiment is characterized by the operation related to the automatic switching between the DEC mode and the WBL mode out of the FG/DEC/WBL modes shown in FIG. 11 described above (more accurately, all modes shown in FIG. 11 are automatic modes, but will simply be referred as modes for the sake of convenience).

In the DEC mode, the motor control is carried out by the function of the CD-DSP 32. In this DEC mode, the signal MPWM and its positive and negative signals MPWMP and MPWMN, that is, the motor control output signal, assumes a high-impedance state when the bit 5 of the servo control register shown in FIG. 6 is set to "1", and output of the loop filter becomes the signal PWM with a constant value when the bit 5 of the servo control register is set to "0".

A connection switching control signal DMCOM with respect to the motor driver assumes a high level.

In the WBL mode, a result obtained by adding a speed comparison signal of the wobble signal and an encoder EFM frame synchronizing signal EEFS, and a phase comparison signal, is output as the signal PWM.

First, a description will be given of the operation in the FG/DEC/WBL mode when there is recorded data.

Figure 12:
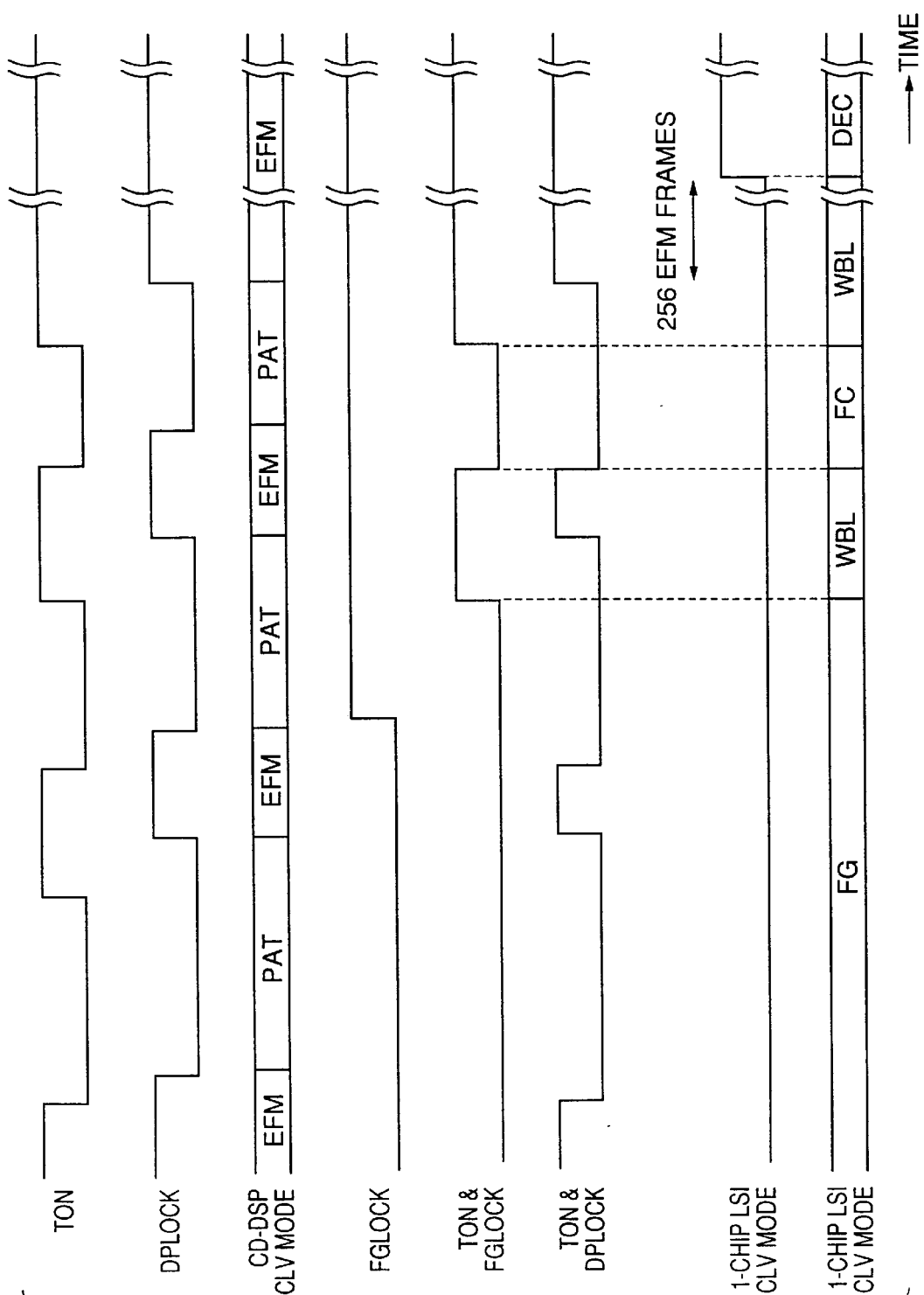
FIG. 12 is a time chart for explaining the operation in a FG/DEC/WBL mode when there is recorded data, with respect to the rotating motor control apparatus of the present invention.

FIG. 12 is a time chart for explaining the operation in the FG/DEC/WBL mode when there is recorded data, with respect to the rotating motor control apparatus of the present invention. In FIG. 12, the same designations as used as in FIG. 2.

In this case, the automatic mode switching operation is carried out so that the mode is switched to the DEC mode when the signal DPLOCK is active, and the mode is switched to the WBL mode when the signal DPLOCK is inactive.

In other words, when the decoder PLL of the CD-DSP 32 is in a locked state, a stable data synchronization is achieved, and the rotating motor is controlled based on the recorded data.

On the other hand, when the decoder PLL of the CD-DSP 32 is not locked, the rotating motor is controlled based on the wobble signal.

Such an operation is effective when controlling the rotation of the CD-R or CD-RW (CD-Rewritable) disk in which a recorded portion and an unrecorded portion coexist.

In the recorded portion, the S/N ratio becomes poor because the wobble signal is distorted by the data, and it is difficult to stably detect the wobble signal.

Accordingly, when the rotation control is continued using the wobble signal, the rotation becomes unstable due to the noise.

This first embodiment focuses on the fact that the rotation can be controlled more stably at such a portion by carrying out the control based on the recorded data (EFM), and controls the rotational motor based on the recorded data when the decoder PLL of the CD-DSP 32 is in the locked state.

But in the unrecorded portion, no data (EFM) exists, and it is impossible to control the rotation based on the data (EFM).

For this reason, the rotation must be controlled based on the wobble signal in such a portion.

A description will be given of the construction of a circuit of the WBL mode.

Figure 13:
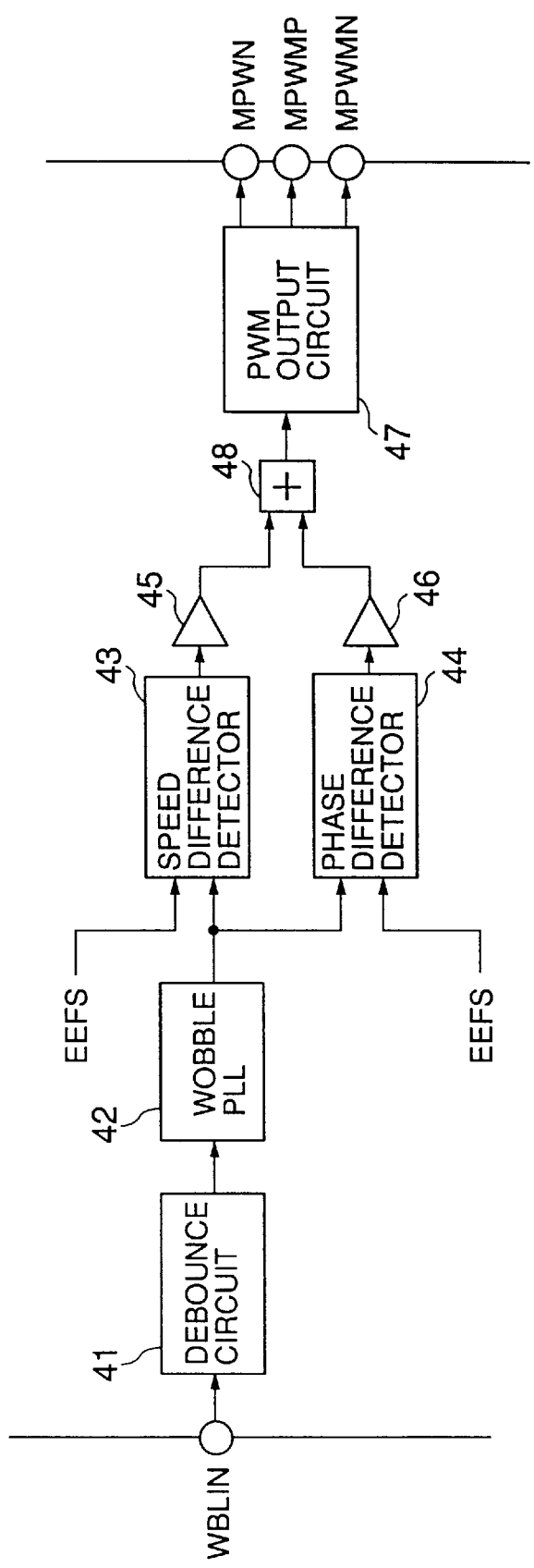
FIG. 13 is a functional block diagram showing an embodiment of the construction of an important part of a circuit of the WBL mode.

FIG. 13 is a functional block diagram showing an embodiment of the construction of an important part of the circuit of the WBL mode. In FIG. 13, the same designations are used as in FIG. 2. FIG. 13 shows a debounce circuit 41, a wobble PLL 42, a speed difference detector 43, a phase difference detector 44, a PWM output circuit 45, amplifiers 46 and 47, and an adder 48.

As shown in FIG. 13, in the circuit of the WBL mode, a wobble signal input WBLIN and an encoder EFM frame synchronizing signal EEFS are compared by the speed difference detector 43, so as to obtain a speed comparison signal. In addition, the wobble signal input WBLIN and the encoder EFM frame synchronizing signal EEFS are compared by the phase difference detector 44, so as to obtain a phase comparison signal.

The speed comparison signal and the phase comparison signal are added by the adder 48, and an added result is input to the PWM output circuit 45, so as to generate the signals MPWM, MPWMP and MPWMN.

Accordingly, in the WBL mode, it is possible to rotate the rotating motor in synchronism with the wobble signal which is the zigzag signal of the guide groove of the CD-R disk.

In order to carry out the above described switching operation by the CPU, it is necessary to monitor the signal DPLOCK quite frequently, thereby increasing the load on the CPU and making it difficult to rotate the rotating motor at a high speed.

As a result, it becomes difficult to increase the recording and reproducing speed of the drive unit.

On the other hand, in this first embodiment, the control mode is automatically switched without having the CPU to carry out the monitoring, and the recording and reproducing speed of the drive unit can be increased.

In this mode, it is further desirable that the mode is first switched to the DEC mode when both the signal TON which indicates that the light beam is tracking the track on the disk and the signal DPLOCK are active and a predetermined time (for example, 256 EFM frames) has elapsed.

The EFM frame refers to 1 unit of the data on the disk, and is approximately 136 $\mu$s in the case of the standard speed of the CD.

By counting the time in frames, the time setting is automatically shortened when the speed is controlled to a speed which is 2, 4 or 8 times the standard speed (1 times speed), so as to suit a high recording and reproducing speed.

In addition, by including the signal TON in the conditions, a track tracking state is guaranteed. Hence, it is possible to avoid an inconvenience of the rotation control which is synchronized to the data from becoming unstable because of abnormal data reproduction in a transient state where the track is not tracked such as when making an access.

In the timing chart shown in FIG. 12, the mode is automatically switched to the DEC mode when the high-level periods of the signal TON and the signal DPLOCK continue over a set value of a servo gain register (not shown), in addition to the operation of the FG/WBL mode which will be described later in conjunction with FIG. 14.

Therefore, in this first embodiment, the automatic switching is controlled between the DEC mode and the WBL mode among the FG/DEC/WBL modes.

In order to control this automatic switching, a data synchronizing rotation control circuit controlling rotation of a rotating motor in synchronism with a recorded data signal, a zigzag synchronizing rotation control circuit controlling the rotation of the rotating motor in synchronism with a zigzag of a guide groove of a disk, a phase synchronizing circuit synchronizing to a phase of the data signal, and a synchronous detection circuit detecting a synchronized state of the phase synchronizing circuit and outputting a lock signal are provided. In addition, the data synchronizing rotation control circuit drives the rotating motor when the lock signal is obtained, and the zigzag synchronizing rotation control circuit drives the rotating motor when no lock signal is obtained.

Accordingly, the mode is automatically switched between the zigzag synchronizing rotation control mode and the data synchronizing rotation control mode, without putting a load on the CPU which forms the controller, and a stable control mode can be obtained even when a recorded portion and an unrecorded portion coexist on the disk.

Further, since there is no load on the CPU, it is possible to reduce the code size of the firmware and to reduce the cost, and in addition, a high-speed rotation can easily be realized.

The operation for a case where a FG control mode is further combined to the above described conditions will be described later in detail in conjunction with the seventh embodiment (seventh embodiment).

Second Embodiment

The second embodiment is related to the third and fourth embodiments which will be described later.

In the first embodiment described above, the automatic switching is controlled between the DEC mode and the WBL mode among the FG/DEC/WBL modes.

In this second embodiment, the signal DPLOCK described above in conjunction with the first embodiment is included in the conditions for switching the mode to the DEC mode between the FG/DEC modes.

A description will be given of the operation in the FG/DEC automatic mode.

Figure 14:
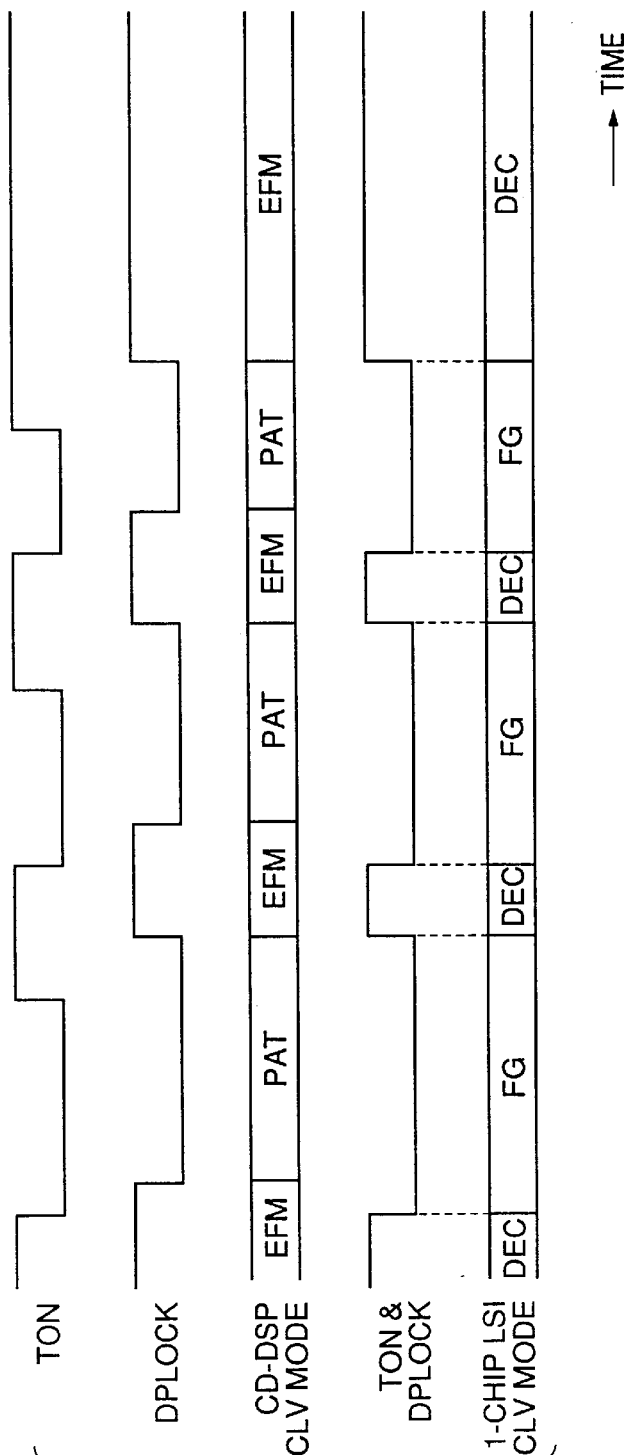
FIG. 14 is a time chart for explaining the operation in a FG/DEC automatic mode, with respect to the rotating motor control apparatus of the present invention.

FIG. 14 is a time chart for explaining the operation in the FG/DEC automatic mode, with respect to the rotating motor control apparatus of the present invention. In FIG. 14, the same designations are used as in FIG. 2.

FIG. 14 shows the operation at a time of a track jump.

When the tracking servo is ON, an automatic switching is made between the FG mode and the DEC mode based on an input signal which indicates the synchronized state of the data EFM obtained from the signal TON and the signal DPLOCK.

As shown in FIG. 14, when the signal DPLOCK is active, the mode is set to the DEC mode and the control is carried out by the CD-DSP 32, while the mode is set to the FG mode when the signal DPLOCK is inactive.

When the signal DPLOCK is active, the decoder PLL of the CD-DSP 32 is locked, and the CLV control can be carried out in synchronism with the data EFM.

On the other hand, when the signal DPLOCK is inactive, the data signal EFM is abnormal or, the linear velocity has not dropped to within a PLL pullin range due to an access or the like.

Hence, in this case, a FG control is carried out in the FG mode.

A description will be given of the construction of a circuit of the FG mode and an interface circuit of the CD encoder.

Figure 15:
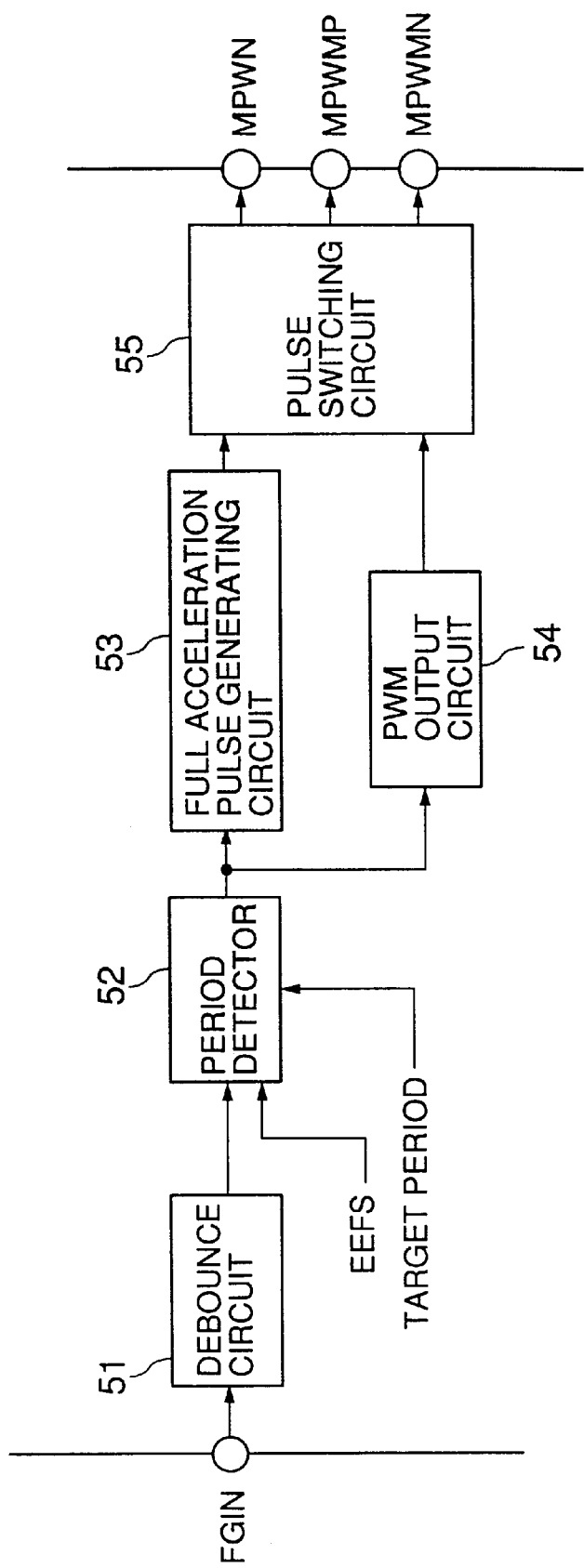
FIG. 15 is a functional block diagram showing an embodiment of the construction of an important part of a circuit of the FG mode.

FIG. 15 is a functional block diagram showing an embodiment of the construction of an important part of the circuit of the FG mode. In FIG. 15, the same designations are used as in FIG. 2. FIG. 15 shows a debounce circuit 51, a period detector 52, a full acceleration pulse generating circuit 53, a PWM output circuit 54, and a pulse switching circuit 55.

The circuit of the FG mode shown in FIG. 15 detects a difference between the period of the signal FGIN and a target period by the period detector 52.

In this case, encoder EFM frame synchronizing pulses EEFS are counted.

Pulses obtained by multiplying a gain to the difference between the target period and the detected period are generated from the full acceleration pulse generating circuit 53.

PWM pulses dependent upon an operation result of the loop filter data are output from the PWM output circuit 54.

The pulses output from the full acceleration pulse generating circuit 53 are output from an output terminal during a time period in which the full acceleration pulse generating circuit 53 generates the pulses, and the PWM pulses output from the PWM output circuit 54 are output from the output terminal during a time period in which the full acceleration pulse generating circuit 53 generates no pulses.

Figure 16:
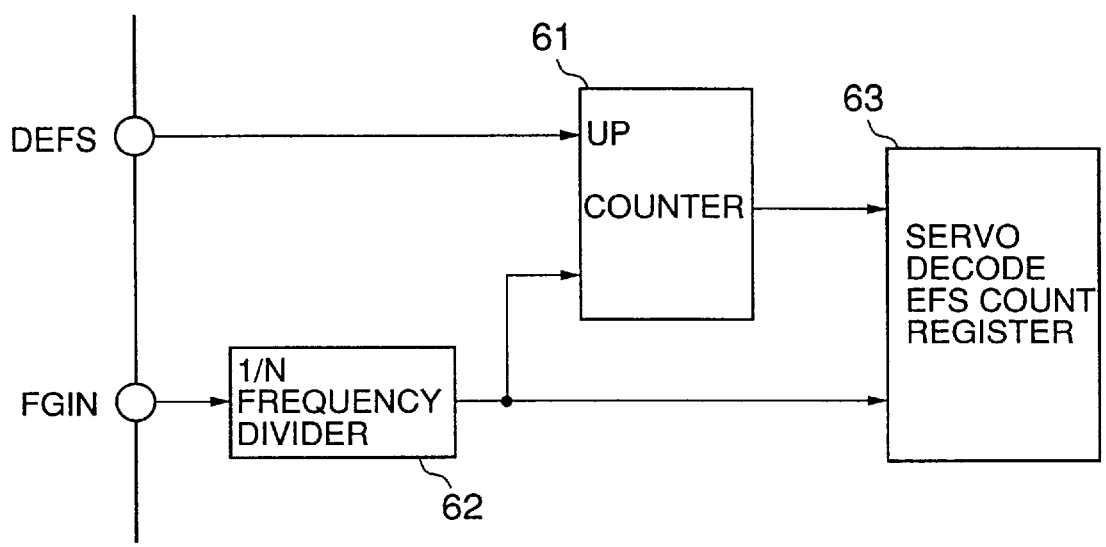
FIG. 16 is a functional block diagram showing an embodiment of the construction of an important part of an interface circuit of a CD encoder.

FIG. 16 is a functional block diagram showing an embodiment of the construction of an important part of the interface circuit of the CD encoder. In FIG. 16, the same designations are used as in FIG. 2. FIG. 16 shows a counter 61, a 1/N frequency divider, and a servo decode EFS count register 63.

The interface circuit of the CD encoder shown in FIG. 16 has a function of detecting the linear velocity of the disk. By setting values so that the EFM frame sync (DEFS) of the CD encoder and the FG signal within a servo decode FG register (not shown) become 1 pulse/1 rotation, it becomes possible to read from the servo decoder EFS count register 63 the value of the number of EFM frame sync (DEFS)/1 rotation.

The linear velocity of the disk can be calculated based on this read value.

Accordingly, this second embodiment is provided with a data synchronizing rotation control circuit controlling rotation of a rotating motor in synchronism with a recorded data signal, a phase synchronizing circuit synchronizing to a phase of the data signal, a synchronous detection circuit detecting a synchronized state of the phase synchronizing circuit and outputting a lock signal, frequency generating means for outputting a FG signal having a frequency proportional to a rotational speed of the rotating motor, and a FG rotation control circuit controlling the motor to a predetermined rotational speed depending on the FG signal. The data synchronizing rotation control circuit drives the rotating motor when the lock signal is obtained, and the FG rotation control circuit drives the rotating motor when no lock signal is obtained.

Therefore, when the data synchronization cannot be achieved in the transient state such as when making an access at a variable speed, the FG control mode is automatically selected. On the other hand, when the data synchronization is achieved, the data synchronization rotation control mode is selected. This second embodiment can obtain effects similar to those obtainable in the first embodiment described above.

Third Embodiment

The third embodiment corresponds is related to the fourth embodiment which will be described later.

In the second embodiment described above, the automatic switching is controlled between the DEC mode and the WBL mode among the FG/DEC/WBL modes described above in conjunction with the first embodiment, and the signal DPLOCK is included in the conditions for switching the mode to the DEC mode between the FG/DEC modes.

In this third embodiment, the automatic switching is controlled between the DEC mode and the WBL mode among the FG/DEC/WBL modes described above in conjunction with the first embodiment, and the signal TON described above in conjunction with the first embodiment is included in the conditions for switching the mode to the DEC mode between the FG/DEC modes.

The light beam is in the track tracking state when the signal TON is active, and thus, the data EFM can be obtained stably in this state.

By setting the signal DPLMSK of the 0x80 register shown in FIG. 6 to "1", it is possible to exclude the signal DPLOCK from the conditions for switching to the DEC mode.

In addition, the reason for including the signal TON in the conditions for switching to the DEC mode in place of the signal DPLOCK is as follows.

When a track jump is made such as when making an access, the data EFM is obtained only for a certain time period if the light beam happens to land on the track, and the PLL will be locked in this case.

But in this state, the light beam is not tracking the track, and this state will not last for a long time.

In such a case, it may be anticipated that the operation will be more stable if the FG control is continued instead.

Hence, this third embodiment is provided with a data synchronizing rotation control circuit controlling rotation of a rotating motor in synchronism with a recorded data signal, frequency generating means for outputting a FG signal having a frequency proportional to a rotational speed of the rotating motor, and a FG rotation control circuit controlling the motor to a predetermined rotational speed depending on the FG signal. The data synchronizing rotation control circuit drives the rotating motor when a light beam of an optical disk unit is in a tracking state where a track of the disk is tracked, and the FG rotation control circuit otherwise drives the rotating motor.

Accordingly, even during the access, it is possible to automatically switch to the data synchronizing rotation control after the stable data is obtained, and it is also possible to obtain effects similar to those obtainable in the first embodiment described above.

Fourth Embodiment

The fourth embodiment is related to the third embodiment described above.

In the third embodiment described above, the signal TON described above in conjunction with the first embodiment is included in the conditions for switching the mode to the DEC mode.

In this fourth embodiment, the signal DPLOCK and the signal TON are included in the conditions for switching the mode to the DEC mode.

By setting the conditions for automatically switching the mode in this manner, it is possible to switch to the DEC mode after the recorded data (EFM) signal is completely and stably obtained. For this reason, it is possible to further stabilize the operation as compared to the third embodiment described above.

Fifth Embodiment

The fifth embodiment is related to the sixth and seventh embodiments which will be described later.

In the first embodiment described above, the automatic switching is made between the DEC/WBL modes among the FG/DEC/WBL modes. In addition, in the second through fourth embodiments described above, the automatic switching is made between the FG/DEC modes among the FG/DEC/WBL modes.

In this fifth embodiment, the automatic switching is made between the FG/WBL modes.

The operation in the FG/WBL automatic mode was described above with reference to FIG. 14.

A description will now be given of the operation in the FG/WBL mode when there is no recorded data.

Figure 17:
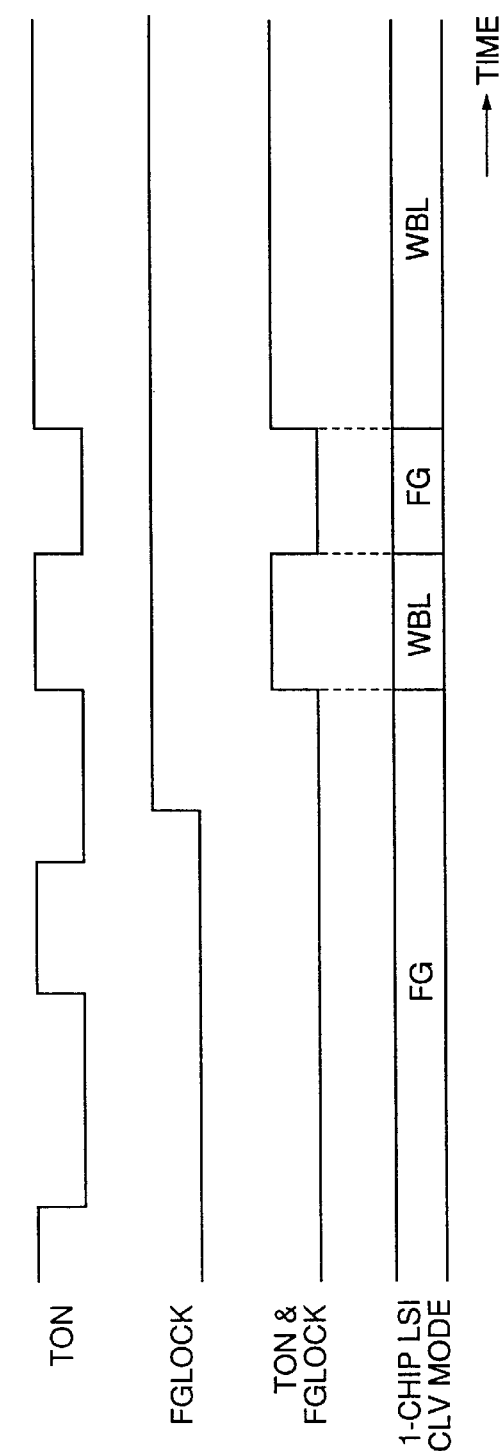
FIG. 17 is a time chart for explaining the operation in a FG/WBL mode when there is no recorded data, with respect to the rotating motor control apparatus of the present invention.

FIG. 17 is a time chart for explaining the operation in the FG/WBL mode when there is no recorded data, with respect to the rotating motor control apparatus of the present invention. In FIG. 17, the same designations are used as in FIG. 2.

FIG. 17 shows a case where the automatic switching is made between the FG mode and the WBL mode based on the signal TON which indicates the ON state of the tracking servo and a signal FGLOCK which indicates that the detected rotational speed in the FG servo system is within ±30% of the target rotational speed.

In the FG/WBL mode, a switching is made between the rotation control using the signal FG and the rotation control using the wobble signal.

For example, the conditions for switching the mode to the WBL mode include the rotational speed which is within ±30% of the target rotational speed at the time of the FG control.

As described above, the wobble signal is generally detected via the narrow band bandpass filter (BPF) in order to improve the S/N ratio. Hence, the conditions for switching the mode to the WBL are set as described above, because the wobble signal frequency will greatly deviate from the passband of the bandpass filter if the rotational speed greatly deviates from the target rotational speed and it would be impossible to detect the wobble signal.

Therefore, in this fifth embodiment, the mode is switched to the WBL mode after the FG control is carried out and the rotational speed falls within a predetermined range (for example, ±30%) of the target rotational speed.

However, in order to carry out the above described switching operation by the CPU, it is necessary to measure the period of the FG and to frequently judge whether or not the period is within a predetermined range, thereby increasing the load on the CPU and making it difficult to rotate the rotating motor at a high speed.

As a result, it becomes difficult to increase the recording and reproducing speed of the drive unit.

On the other hand, in this fifth embodiment, the control mode is automatically switched without having the CPU to carry out the monitoring, and the recording and reproducing speed of the drive unit can be increased.

Accordingly, this fifth embodiment is provided with a zigzag synchronizing rotation control circuit controlling a rotation of a rotating motor in synchronism with a zigzag of a guide groove of a disk, frequency generating means for outputting a FG signal having a frequency proportional to a rotational speed of the rotating motor, and a FG rotation control circuit controlling the motor to a predetermined rotational speed depending on the FG signal. The FG rotation control circuit drives the rotating motor when the frequency of the FG signal is outside a predetermined range, and the zigzag synchronizing rotation control circuit drives the rotating motor when the frequency of the FG signal is within the predetermined range.

Therefore, it is always possible to stably carry out the rotation control when accessing the recordable disk, and it is also possible to obtain effects similar to those obtainable in the first embodiment described above.

Sixth Embodiment

The sixth embodiment is related to the fifth embodiment described above.

In the first embodiment described above, the automatic switching is made between the DEC/WBL modes among the FG/DEC/WBL modes. In addition, in the second through fourth embodiments described above, the automatic switching is made between the FG/DEC modes among the FG/DEC/WBL modes. Furthermore, in the fifth embodiment described above, the automatic switching is made between the FG/WBL modes.

In this sixth embodiment, a loop filter is used in common between the FG mode and the WBL mode in the fifth embodiment described above.

Figure 18:
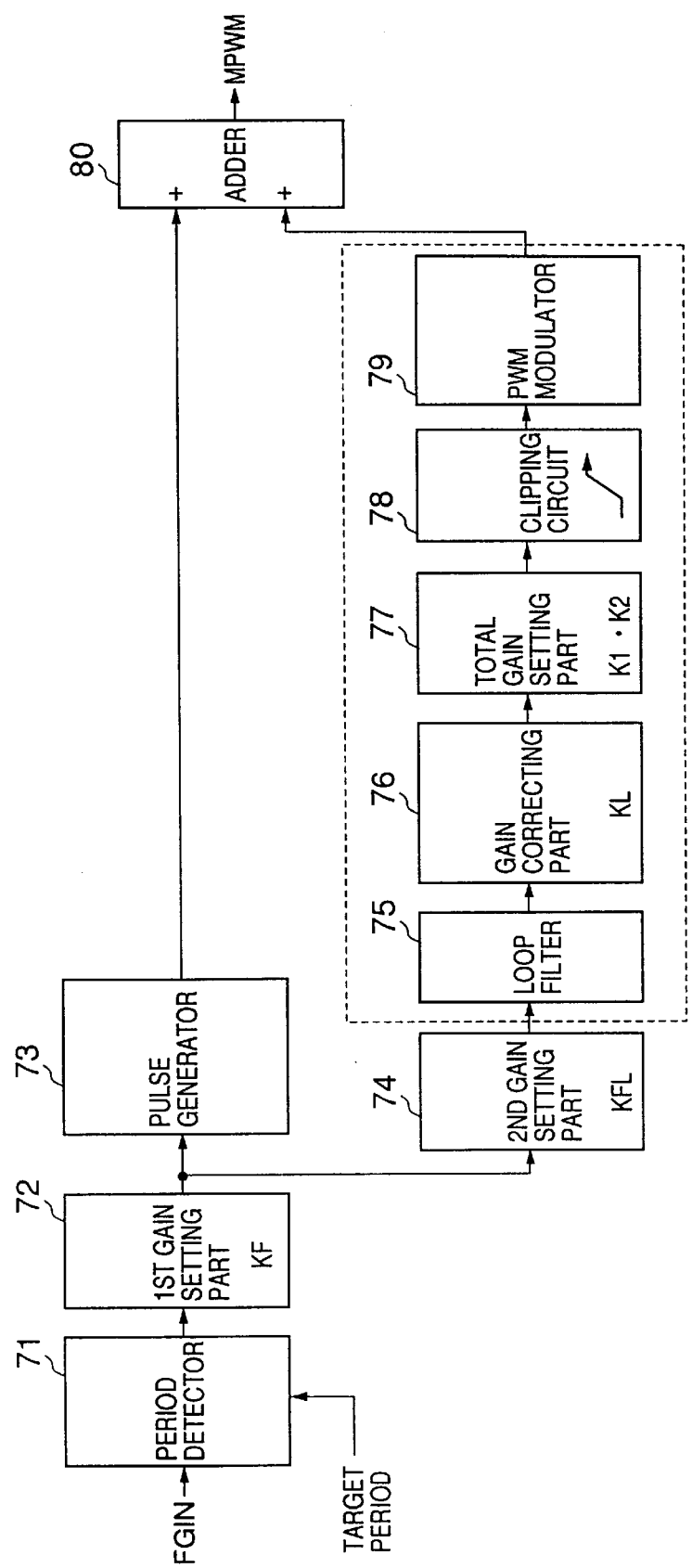
FIG. 18 is a functional block diagram showing an embodiment of the construction of an important part of a gain correction circuit of the FG mode.

FIG. 18 is a functional block diagram showing an embodiment of the construction of an important part of a gain correction circuit of the FG mode. In FIG. 18, the same designations are used as in FIG. 2. FIG. 18 shows a period detector 71, a first gain setting part 72, a pulse generator 73, a second gain setting part 74, a loop filter 75, a gain correcting part 76, a total gain setting part 77, a clipping circuit 78, a PWM modulator (pulse width modulator) 79, and an adder 80. KF, KFL, KL, K1 and K2 denote gains which are set.

The gains shown in FIG. 18, including the set gain KF to the first gain setting part 72 and the set gain KFL to the second gain setting part 74, are set by making a setting to a first servo gain register (not shown).

The gains, such as the set gain KL to the gain correcting part 76 and the set gains K1 and K2 to the total gain setting part 77, are respectively set by making a setting to a second servo gain register (not shown) and a third servo gain register (not shown).

An accumulator part (loop filter) surrounded by a dotted line in FIG. 18 is used in common by the FG mode system and the WBL mode system, and the accumulated data obtained during the accumulation process are also succeeded between the two modes.

In the FG mode, a difference between the FGIN period and the target period is obtained as shown in FIG. 18.

A motor control output MPWM is output depending on a result which is obtained by accumulating the difference and multiplying a gain to the accumulated difference.

By accumulating the difference of the periods (frequency difference), it is possible to increase the low-frequency gain of the rotation control loop, and a high precision control can be achieved.

This accumulator part is sometimes referred to as a loop filter.

Figure 19:
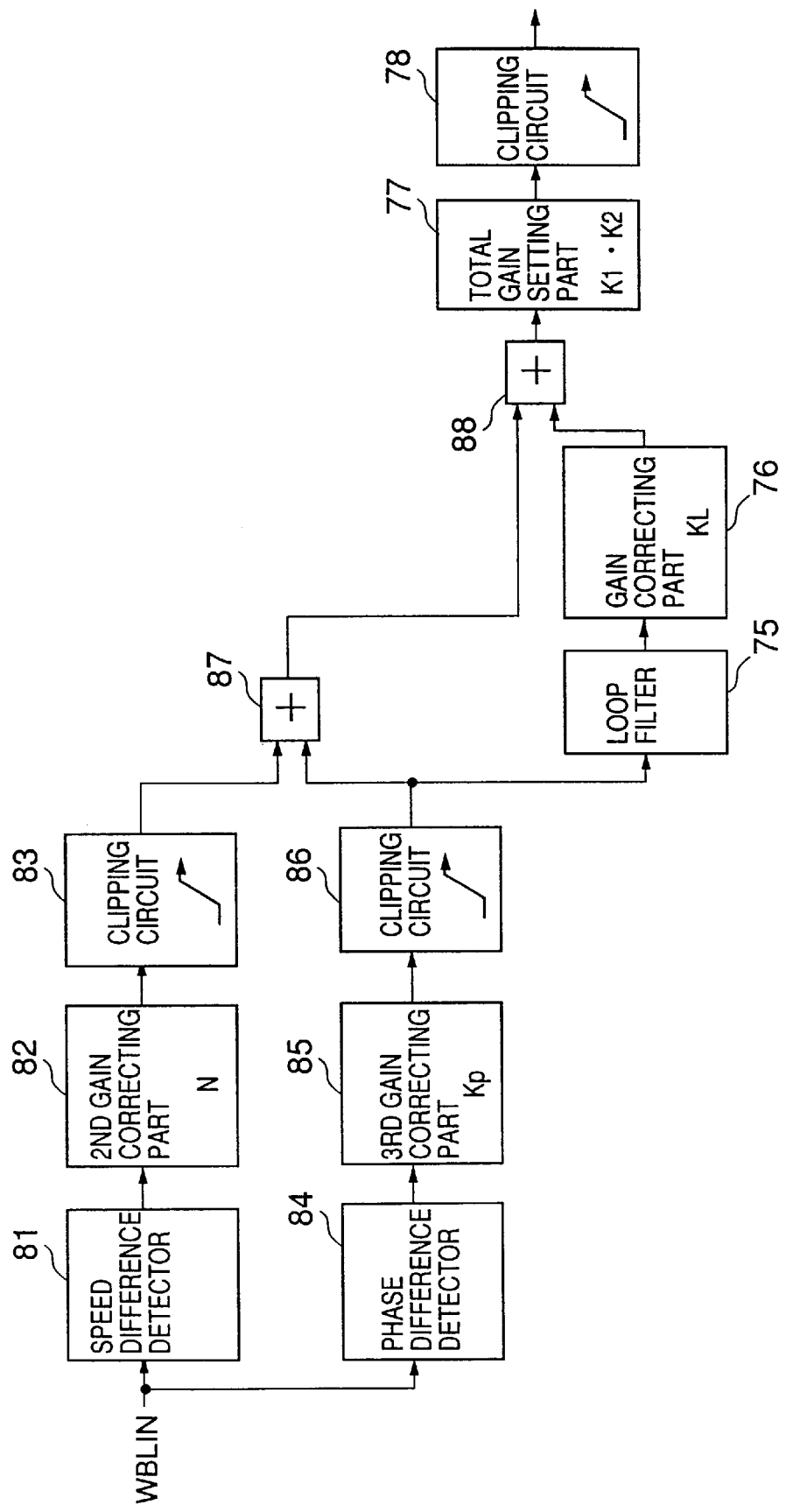
FIG. 19 is a functional block diagram showing an embodiment of the construction of an important part of a gain correction circuit of the WBL mode.

FIG. 9 is a functional block diagram showing an embodiment of the construction of an important part of a gain correction circuit of the WBL mode. In FIG. 19, the same designations are used as in FIGS. 2 and 18. FIG. 19 shows a speed difference detector 81, a second gain correcting part 82, a clipping circuit 83, a phase difference detector 84, a third gain correcting part 85, a clipping circuit 86, and adders 87 and 88. N and Kp denote gains which are set.

As shown in FIG. 19, in the WBL mode, the set gain N to the second gain correcting part 82 and the set gain Kp to the third gain correcting part 85 are respectively set by making a setting to the second servo gain register (not shown) and the third servo gain register (not shown).

In this WBL mode, the loop filter shown in FIG. 18 is also used.

In the WBL mode, the frequency (rotational speed) and phase of the wobble signal (WBLIN) are compared with those of a reference pulse (ESFS: encoder EFM frame sync).

Generally, the reference pulse ESFS is generated by a reference oscillator.

The speed difference and the phase difference obtained by the comparison are respectively multiplied by a gain and added.

In the accumulator part (loop filter), the added result from the speed difference system and the phase difference system are accumulated.

The accumulated output and the original added result are added, and then multiplied by a gain, so as to output the motor control output MPWM.

Figure 20:
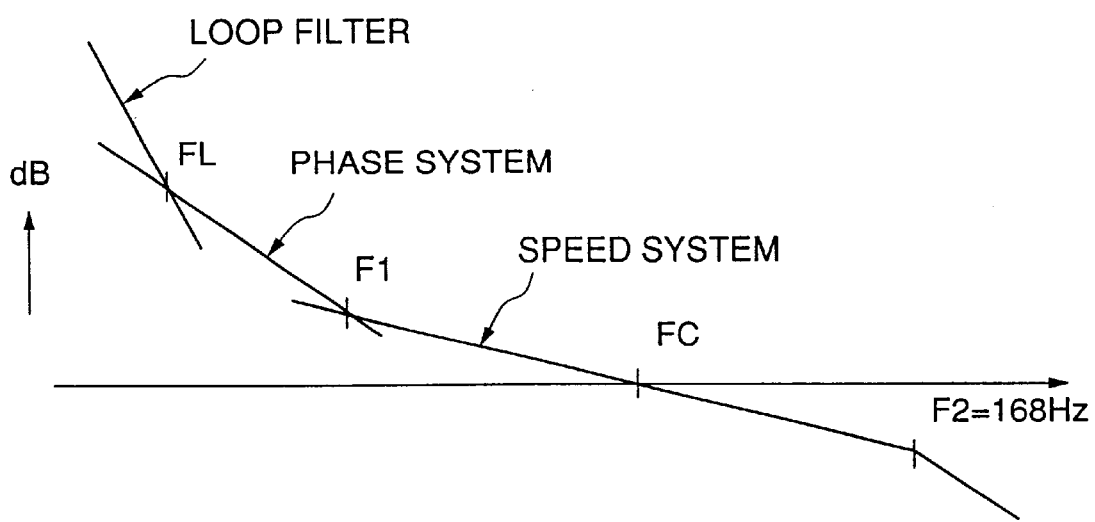
FIG. 20 is a diagram showing a loop gain characteristic in the WBL mode.

A loop gain characteristic in this WBL mode becomes as shown in FIG. 20.

FIG. 20 is a diagram showing an embodiment of the loop gain characteristic in the WBL mode.

FIG. 20 shows a Bode line graph.

As shown in FIG. 20, the phase difference system amplifies the low-frequency region of the speed difference system, and the loop filter system amplifies the low-frequency region, according to this characteristic.

The control characteristic in the low-frequency region is improved by this loop filter.

Therefore, in this sixth embodiment, the accumulating loop filter is used in common between the FG mode and the WBL mode. For this reason, the circuit construction is simplified, and it is possible to obtain a high precision control characteristic in either mode.

Furthermore, the control is not distorted when the mode is switched because the accumulated values are succeeded, thereby making it possible to smoothly switch the mode.

Therefore, in the rotating motor control apparatus described above in conjunction with the fifth embodiment, this sixth embodiment is provided with a frequency comparator comparing the frequency of the FG signal and a target frequency of the FG rotation control circuit, a phase comparator comparing a phase of a zigzag signal and a phase of a reference signal of the zigzag synchronizing rotation control circuit, and an accumulator accumulating a comparison result of one of the two comparators. The FG rotation control circuit drives the rotating motor depending on an output of the frequency comparator and a product obtained by accumulating the comparison result to the output of the frequency comparator, and the zigzag synchronizing rotation control circuit drives the rotating motor depending on an output of the phase comparator and a product obtained by accumulating the comparison result to the output of the phase comparator.

Accordingly, it is possible to use the loop filter in common between the two control modes, and in addition to reducing the cost of the circuit, it is possible to stabilize the control at the time of switching the mode because the accumulated values are succeeded.

Seventh Embodiment

The seventh embodiment is related to the fifth embodiment described above.

This seventh embodiment is characterized in that, in addition to the FG/WBL mode described above in conjunction with the fifth embodiment, it is also possible to switch the mode to the DEC mode.

The operation in the FG/DEC/WBL mode when there is recorded data was described above in conjunction with FIG. 12.

A description will now be given of the operation in the FG/DEC/WBL mode when there is no recorded data.

Figure 21:
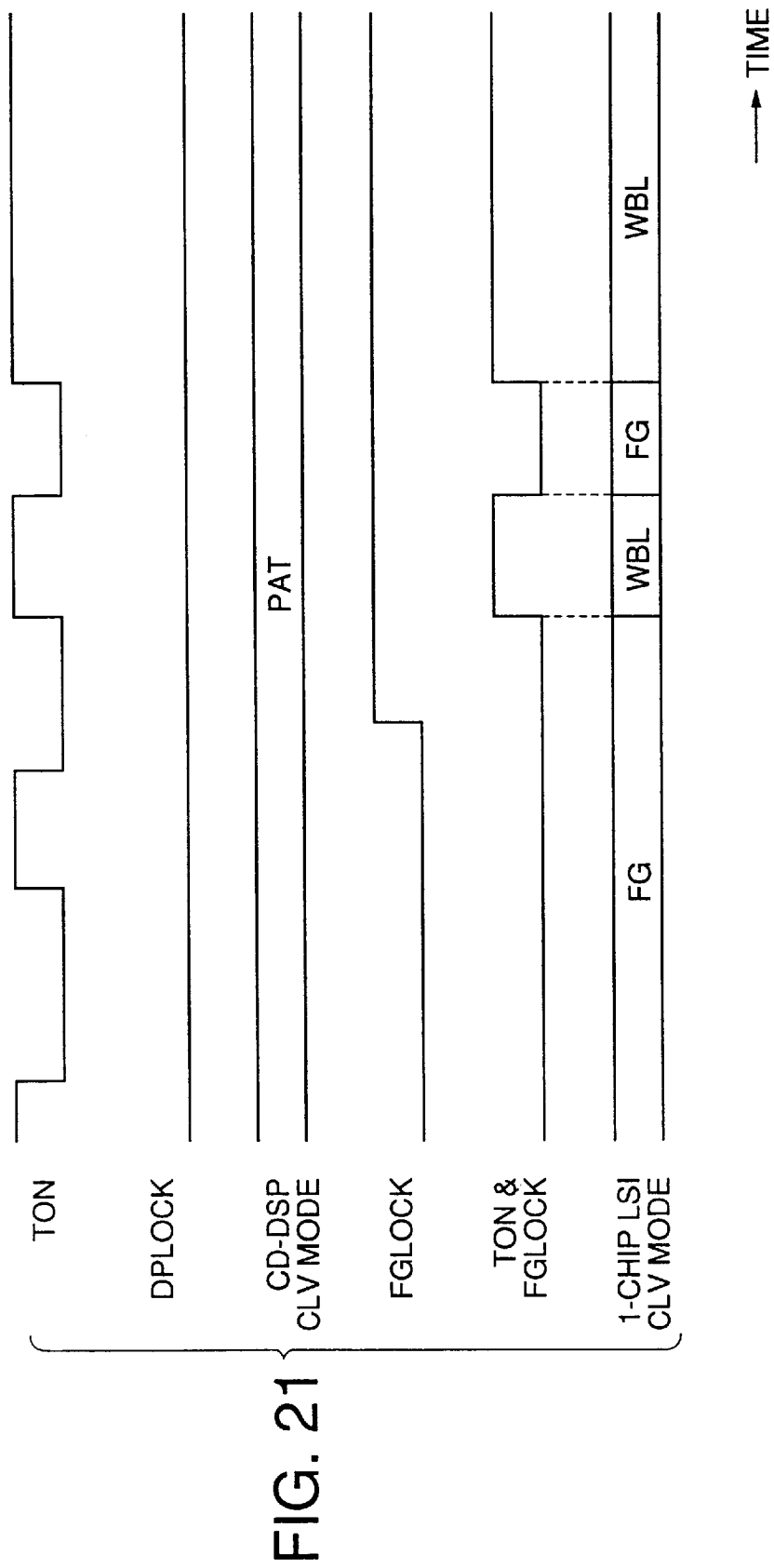
FIG. 21 is a time chart for explaining the operation in a FG/DEC/WBL mode when there is no recorded data, with respect to the rotating motor control apparatus of the present invention.

FIG. 21 is a time chart for explaining the operation in the FG/DEC/WBL mode when there is no recorded data, with respect to the rotating motor control apparatus of the present invention. In FIG. 21, the same designations are used as in FIG. 2.

As shown in FIG. 21 and FIG. 12 described above, the mode is switched to the DEC mode when the signal DPLOCK is active, switched to the WBL mode when the signal DPLOCK is inactive and the signal FG is within the predetermined range (for example, ±30%) of the target period, and switched to the FG mode when the signal DPLOCK is inactive and the signal FG is outside the predetermined range (for example, ±30%) of the target period.

By such an automatic switching of the mode, a stable control is always automatically selected and set, even in the case of the disk on which the recorded portion and the unrecorded portion coexist, and the load on the CPU is reduced.

Therefore, it is possible to realize a high-speed rotation.

Eighth Embodiment

The eighth embodiment is related to the second through seventh embodiments described above and to the ninth and tenth embodiments which will be described later.

This eighth embodiment is characterized in that the kick acceleration mode is first set at an initial stage of the acceleration, the rotating motor is accelerated at a predetermined power, and the mode is switched from the kick acceleration mode to the FG mode at a time when several (for example, 2) FG pulses are obtained.

The setting of this automatic switching mode (KICK to FR automatic mode) for switching from the kick acceleration mode to the FG mode was described above in conjunction with FIG. 11.

The kick acceleration mode is first set at the initial stage of the acceleration because, if the FG mode is set from the beginning, the FG period cannot be measured and the acceleration cannot be achieved while no FG pulse is obtained.

When the above described operation is to be carried out by the CPU, it is necessary to monitor by software whether or not there is an incoming FG pulse. In this case, the load on the CPU increases, and it becomes difficult to achieve a high-speed rotation.

Therefore, in the rotating motor control apparatus described above in conjunction with the second through seventh embodiments, this eighth embodiment is provided with a kick mode setting means for setting a kick mode in which the rotating motor is accelerated at a predetermined power, and the FG rotation control circuit controls the rotating motor when the rotating motor is accelerated from a stopped state by the kick mode and a FG signal pulse reaches a predetermined rotational speed.

Accordingly, in addition to the effects obtainable in the second through seventh embodiments, it is possible to stably start the rotation without increasing the load on the CPU.

Ninth Embodiment

The ninth embodiment is related to the second through eighth embodiments described above and to the tenth embodiment which will be described later.

This ninth embodiment is characterized by the control for the case where the motor is decelerated from a state where the motor is rotating. In other words, a brake mode is set in the state where the rotating motor is rotating, and the motor is decelerated at a predetermined power. A signal REVDET is input, and the mode is automatically switched to a stop mode from the brake mode when a reverse rotation is detected.

The setting of this automatic switching mode (BRAKE to STOP automatic mode) for switching from the brake mode to the stop mode was described above in conjunction with FIG. 11.

According to this ninth embodiment, the brake mode is set in the state where the rotating motor is rotating, and the motor is decelerated at the predetermined power. In addition, the signal REVDET is input, and the mode is automatically switched to the stop mode when the reverse rotation is detected. For this reason, in addition to the effects obtainable in the second through eighth embodiments described above, it is possible to eliminate the inconvenience in that the load on the CPU is large, and the motor can be stopped stably.

Tenth Embodiment

The tenth embodiment is related to the second through ninth embodiments described above.

This tenth embodiment is characterized in tat, a short-circuit brake signal is output when the frequency of the signal FG is a predetermined range higher than the target value, so as to decelerate the motor.

When decelerating the motor in the stop mode after switching from the FG mode, the FG/WBL mode, FG/DEC mode and the brake mode described above, the motor control output MPWM for rotating the motor in the reverse direction is input to the motor driver, and a current for rotating the motor in the reverse direction flows to the motor.

However, in general, a counter-electromotive force in the reverse direction and proportional to the rotational speed is generated when the motor rotates. For this reason, when the current for rotating the motor in the reverse direction flows to the motor, this current is added to a current which is generated by the counter-electromotive force. Consequently, a large current for rotating the motor in the reverse direction flows to the motor.

As a result, the power consumption becomes large, and heat generated from the motor coils and the motor driver becomes large.

Conventionally, a generally employed control method applies the brake on the motor by short-circuiting the ends of the motor coils.

However, the deceleration control is not only necessary when simply stopping the motor, but is also necessary for the CLV rotation when making access to the disk by moving the optical head in the outer peripheral direction of the disk.

This tenth embodiment can apply the short-circuit braking when making the deceleration under various situations.

When decelerating during an access, the short-circuit braking is released at a time when the target rotational speed is approaches after the short-circuit braking is applied, because the target rotational speed of the FG control is set.

Therefore, in the rotating motor control apparatus described above in conjunction with the second through ninth embodiments, this tenth embodiment is provided with short-circuit brake signal output means for generating a brake signal which short-circuits coils of the rotating motor, and the short-circuit brake signal is output only when the frequency of the FG signal is higher than a target value by a predetermined range.

Accordingly, in addition to the effects obtainable in the second through ninth embodiments described above, it is possible to realize a deceleration control with reduced power consumption, without increasing the load on the CPU.

Eleventh Embodiment

The eleventh embodiment is related to the twelfth and thirteenth embodiments which will be described later.

In the first through tenth embodiments described above, the mode is switched among the FG/DEC/WBL modes.

This embodiment is related to the WBL mode and an AX mode.

In the AX mode, a phase comparison is made of an ATIP synchronizing signal ASYNC which is obtained by decoding the signal ATIP, and a reference signal ESFS (75 Hz at the standard speed), and the rotating motor is driven depending on the comparison result.

The ATIP synchronizing signal ASYNC is embedded in the zigzag groove of the disk by frequency-modulating the wobble signal. At the standard speed, the ATIP synchronizing signal ASYNC has a frequency of 75 Hz.

Hence, in the AX mode, the rotation control is carried out in a state where the ATIP synchronizing signal ASYNC and the reference signal ESFS are phase synchronized.

If the reference signal ESFS is set to a reference timing signal of the write data, it is possible to realize a write process such that the write data and position on the disk perfectly match.

Figure 22:
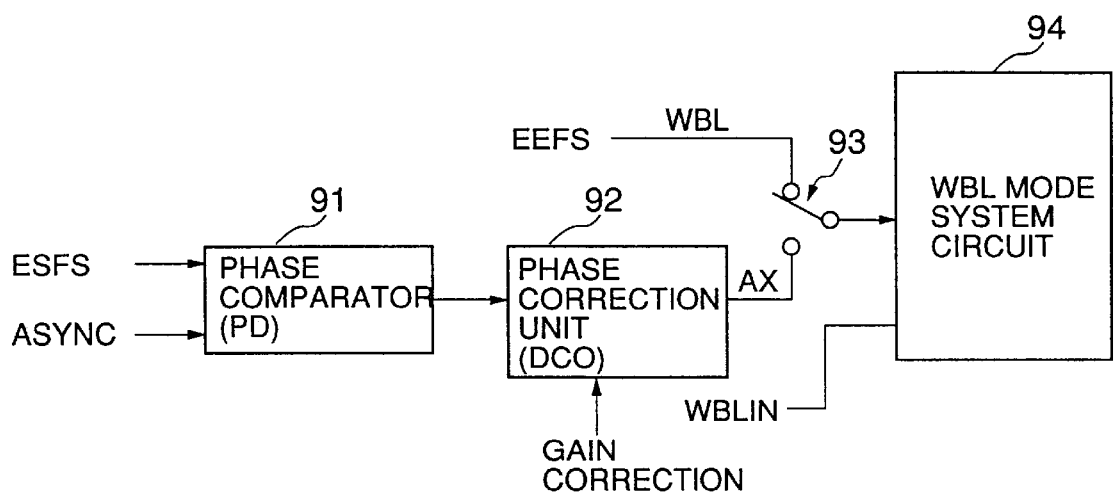
FIG. 22 is a functional block diagram showing an embodiment of the construction of an important part of a circuit of the AX mode.

FIG. 22 is a functional block diagram showing an embodiment of the construction of an important part of a circuit of the AX mode. In FIG. 22, the same designations are used as in FIG. 2. FIG. 22 shows a phase comparator (PD) 91, a phase correction unit (DCO) 92, a switch 93, and a WBL mode system circuit 94.

Figure 23:
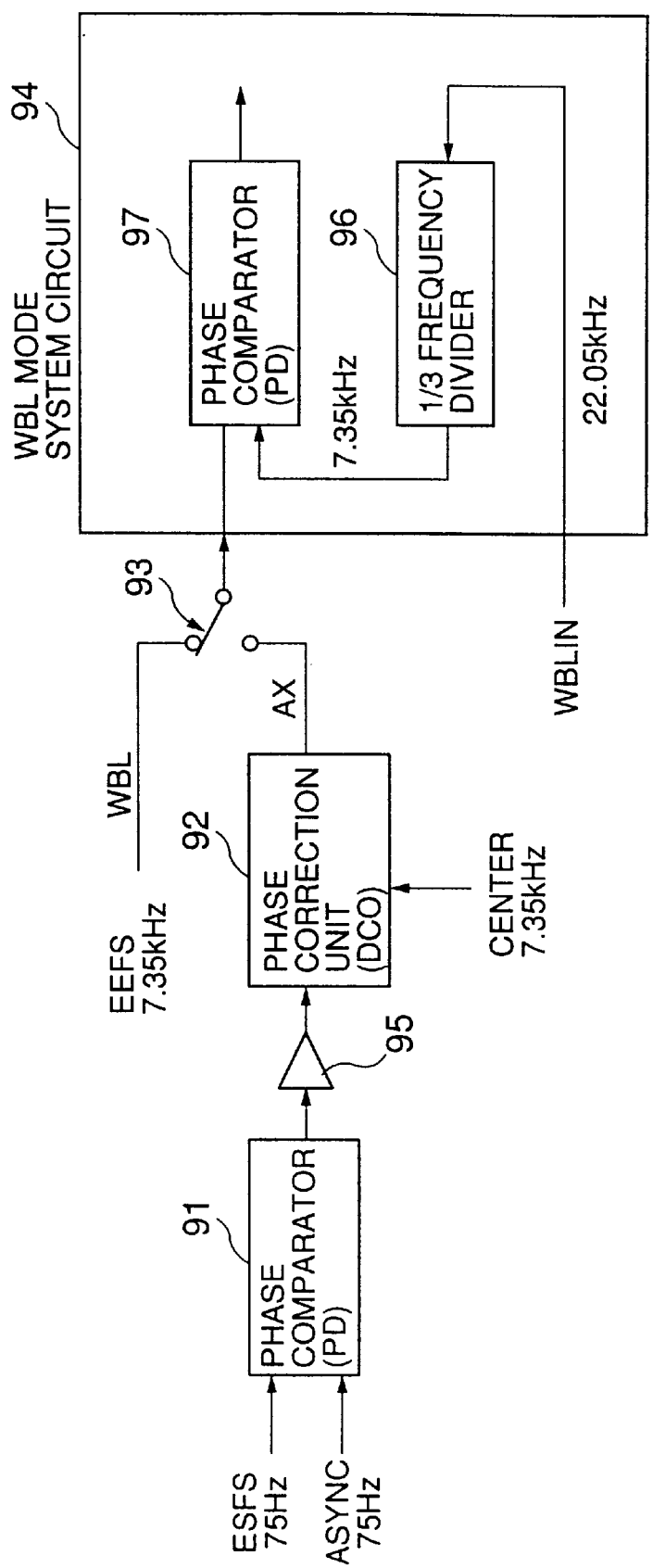
FIG. 23 is a functional block diagram showing another embodiment of the construction of an important part of a circuit of the AX mode.

FIG. 23 is a functional block diagram showing another embodiment of the important part of the circuit of the AX mode. In FIG. 23, the same designations are used as in FIG. 22. FIG. 23 shows an amplifier 95, a ⅓ frequency divider 96, and a phase comparator (PD) 97.

In the WBL mode, the encoder EFM frame synchronizing signal EEFS is used as a reference clock. On the other hand, in the AX mode, the phase of the reference clock is changed depending on a phase difference between the encoder sub code synchronizing signal ESFS and the detected STIP synchronizing signal ASYNC.

A delay is introduced by a FSK demodulator and an ATIP synchronization detection circuit from the ATIP synchronizing signal on the disk to the detected ATIP synchronizing signal, and a delay value may be set accordingly.

Figure 24:
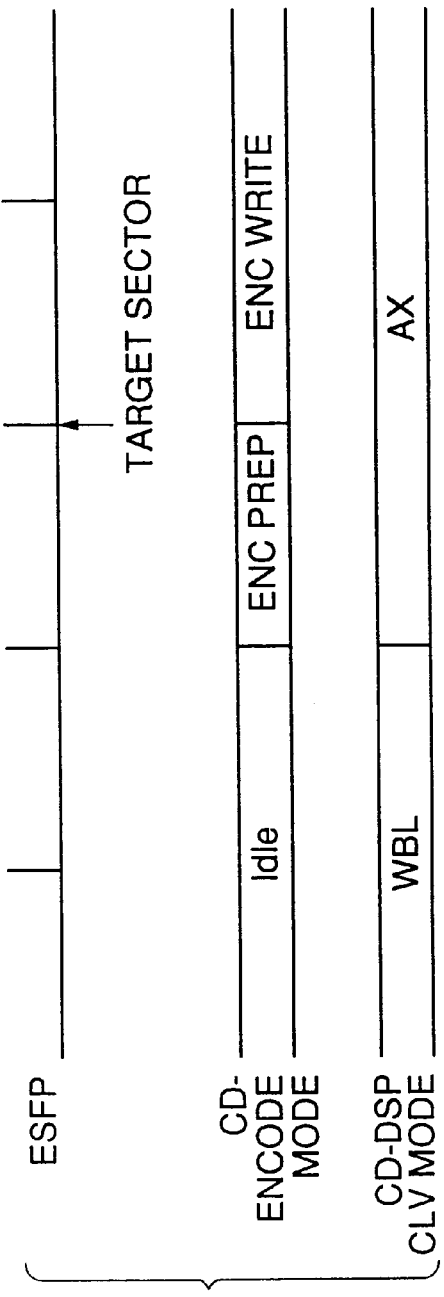
FIG. 24 is a time chart for explaining the operation in a FG/WBL mode at a start of a write process.

FIG. 24 is a time chart for explaining the operation in the FG/WBL mode at the start of the write process. In FIG. 24, the same designations are used as in FIG. 22.

Figure 25:
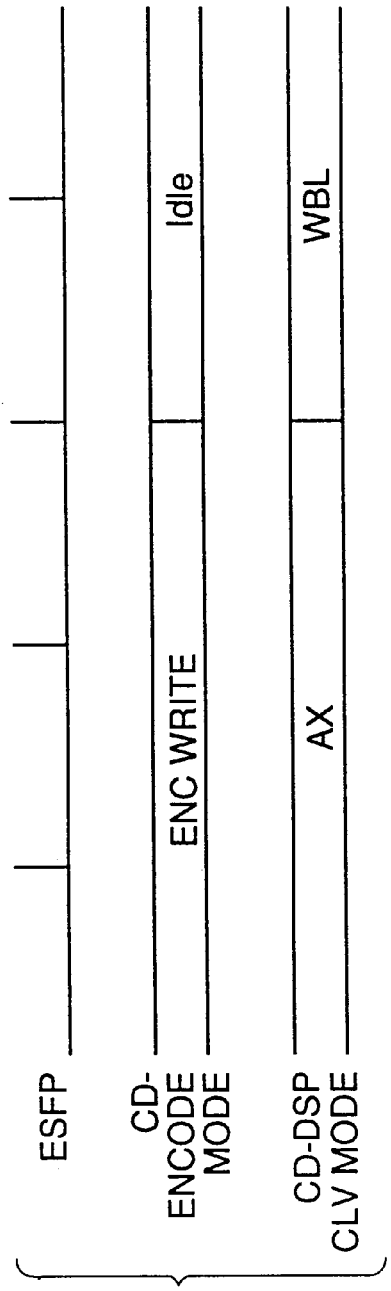
FIG. 25 is a time chart for explaining the operation in the FG/WBL mode at an end of the write process.

FIG. 25 is a time chart for explaining the operation in the FG/WBL mode at the end of the write process. In FIG. 25, the same designations are used as in FIG. 22.

In this eleventh embodiment, the switching between the WBL/AX modes is made so that the mode is set to the WBL mode up to a position slightly before (for example, 1 sector before) a position (address) where the write process starts, and the mode is switched to the AX mode when the position slightly before the position where the write process starts is reached.

The switching between the WBL/AX modes is made as described above, because the WBL mode enables control at a high speed due to the high frequency (22 kHz) of the wobble signal, and the settling can be achieved quickly. Hence first, the rotational speed is completely synchronized to the wobble signal in the WBL mode.

The mode is then switched to the AX mode immediately before the start of the write process, and the write process started thereafter.

When the above described switching between the WBL mode and the AX mode is to be carried out by the CPU, the CPU must frequently monitor the present address and judge whether or not the address is a predetermined number before the address where the write process is to start. In this case, the load on the CPU increases, and there is a limit to increasing the rotational speed. But this eleventh embodiment can eliminate these inconveniences.

In other words, the high-speed control by the zigzag synchronizing rotation control is possible until the recording starts, and the address synchronization can be achieved during the recording. As a result, it is possible to finely control the recording, in addition to being able to obtain effects similar to those obtainable in the first embodiment described above.

Twelfth Embodiment

The twelfth embodiment is related to the eleventh embodiment described above.

The eleventh embodiment described above is related to the switching between the WBL/AX modes.

This twelfth embodiment is related to the improvement of the AX mode itself.

This twelfth embodiment is characterized in that a phase comparison is made between the ATIP synchronizing signal ASYNC and the reference signal ESFS (75 Hz at standard speed). A variable frequency oscillator varied of its frequency based on the comparison result is provided, and an output of this variable frequency oscillator is used as a reference signal of the WBL mode system.

The variable frequency oscillator which is used in this case is a digital circuit. Hence, this embodiment refers to the variable frequency oscillator as a DCO (Digital Controlled Oscillator).

The frequency of the reference signal output from the DCO varies depending on a phase comparison result between the ATIP synchronizing signal ASYNC and the reference signal ESFS. As a result, it is possible to carry out a phase synchronized rotation control of the ATIP synchronizing signal ASYNC and the reference signal ESFS.

When switching the mode to the WBL mode, a WBL mode system reference signal EEFS (encoder EFM frame synchronizing signal: 7.35 kHz at the standard speed) is used as the reference signal of the WBL mode system in place of the DCO output.

This switching of the mode may be realized by a simple switch.

Therefore, according to this twelfth embodiment, it is possible to realize the AX mode by using the WBL mode system in common for the WBL/AX modes.

In addition, even during the AX mode, the WBL mode system is synchronized to the wobble signal and closed, thereby enabling a control in the high-frequency region.

Thirteenth Embodiment

The thirteenth embodiment is related to the eleventh embodiment described above.

This thirteenth embodiment is characterized in that, after the recording ends in the WBL/AX mode, the mode automatically switches the WBL mode.

In the eleventh embodiment described above, the AX mode is unnecessary except for during the recording. For this reason, the mode is automatically switched to the WBL mode since it is preferable to quickly switch the mode to the WBL mode after the recording ends.

Therefore, by automatically switching the mode to the WBL mode after the recording ends, it is possible to resume the WBL mode without putting a load on the CPU.

Fourteenth Embodiment

The fourteenth embodiment is related to the first through thirteenth embodiments described above.

In the first through thirteenth embodiments described above, the load on the CPU is reduced by making a transition to the automatic mode in relation to the operation of automatically switching among the FG/DEC/WBL/AX modes.

According to the first through thirteenth embodiments, it is possible to reduce the code size of the software which is installed (actually called firmware since it is installed in the ROM), and it is possible to reduce the cost by using a ROM having a small memory capacity.

This fourteenth embodiment distributes the above described operation in the LSI of the drive unit.

Generally, the circuit for controlling the rotation in synchronism with the recorded data, the PLL which achieving phase synchronism with the recorded data, and the circuit for outputting the locked state of the PLL (signal DPLOCK) are built into the CD-DSP.

A LSI chip of such a CD-DSP is popularly used in CD-ROM units, and this LSI chip is inexpensive because such chips are produced in extremely large numbers.

Other circuits, such as the circuits of the FG, WBL and AX automatic modes are built into a LSI chip exclusively for the CD-R.

By employing such a construction, the control itself of the DEC mode can be entrusted to the CD-DSP, and the functions related to the DEC mode control do not need to be built into the CD-R LSI chip. Hence, the cost of the CD-R LSI chip for control can be reduced.

Therefore, it is possible to obtain an inexpensive CD-R drive.

The present application is based on Japanese priority patent applications No. 9-113503 filed on Apr. 15, 1997 and No. 9-172774 filed on Jun. 16, 1997, the entire contents of which are hereby incorporated by reference.

Further, the present invention is not limited to these embodiments, but various variations and modifications may be made without departing from the scope of the present invention.

What is claimed is:

1. A rotating motor control apparatus for a recordable optical disk unit, comprising:

a zigzag synchronizing rotation control circuit controlling a rotation of a rotating motor in synchronism with a zigzag of a guide groove of a disk;

a synchronizing signal detection circuit detecting an address synchronizing signal arranged as the zigzag of the guide groove for every predetermined distance in a linear direction of the guide groove; and an address synchronizing rotation control circuit controlling the rotation of the rotating motor in synchronism with the address synchronizing signal, said zigzag synchronizing rotation control circuit driving the rotating motor up to a predetermined position in front of a recording start address, and said address synchronizing rotation control circuit driving the rotating motor from the predetermined position in front of the recording start position.

2. The rotating motor control apparatus as claimed in claim 1, wherein said address synchronizing rotation control circuit comprises:

a phase comparator comparing phases of the address synchronizing signal and a reference clock signal; and a variable frequency oscillator outputting a frequency dependent on a comparison result of the phase comparator, said zigzag synchronizing rotation control circuit being coupled to control the rotation of the rotating motor in synchronism with the zigzag of the guide groove by using the output of the variable frequency oscillator as a reference input.

3. The rotating motor control apparatus as claimed in claim 1, wherein said zigzag synchronizing rotation control circuit drives the rotating motor after the recording ends.

4. A recordable optical disk unit comprising:

a rotating motor control apparatus comprising:

a zigzag synchronizing rotation control circuit controlling a rotation of a rotating motor in synchronism with a zigzag of a guide groove of a disk;

a synchronizing signal detection circuit detecting an address synchronizing signal arranged as the zigzag of the guide groove for every predetermined distance in a linear direction of the guide groove; and an address synchronizing rotation control circuit controlling the rotation of the rotating motor in synchronism with the address synchronizing signal, said zigzag synchronizing rotation control circuit driving the rotating motor up to a predetermined position in front of a recording start address, and said address synchronizing rotation control circuit driving the rotating motor from the predetermined position in front of the recording start position, a data synchronizing rotation control circuit controlling the rotation of the rotating motor in synchronism with a recorded data signal;

a phase synchronizing circuit synchronizing to a phase of the data signal; and a synchronous detection circuit detecting a synchronized state of the phase synchronizing circuit and outputting a lock signal, are built into a first digital signal processing LSI, and other processing means are built into a second digital signal processing LSI.

* * * * *